(12) United States Patent
Mackarvich et al.

(10) Patent No.: US 10,940,903 B2
(45) Date of Patent: Mar. 9, 2021

(54) MODULAR MILITARY VEHICLE

(71) Applicant: Tie Down, Inc., Atlanta, GA (US)

(72) Inventors: Dustin Sloan Mackarvich, Smyrna, GA (US); Stephen J. Tegge, Troy, MI (US); Patrick William Maloney, Burnt Hills, NY (US); Franklin B. Jones, Shrewsbury, MA (US); Justin Hikaru Alcober, Smyrna, GA (US); Matthew Phillip Vickers, Atlanta, GA (US); Warren van Nus, Lawrenceville, GA (US)

(73) Assignee: Tie Down, Inc., Atlanta, GA (US)

( * ) Notice: Subject to any disclaimer, the term of this patent is extended or adjusted under 35 U.S.C. 154(b) by 0 days.

(21) Appl. No.: 16/289,869

(22) Filed: Mar. 1, 2019

(65) Prior Publication Data

US 2020/0023916 A1 Jan. 23, 2020

Related U.S. Application Data

(60) Provisional application No. 62/637,153, filed on Mar. 1, 2018.

(51) Int. Cl.
| | | |
|---|---|---|
| *B60K 6/22* | (2007.10) | |
| *B62D 63/02* | (2006.01) | |
| *B60K 7/00* | (2006.01) | |
| *B62D 61/12* | (2006.01) | |
| *F41H 5/013* | (2006.01) | |
| *F41H 7/04* | (2006.01) | |

(Continued)

(52) U.S. Cl.
CPC ............. *B62D 63/025* (2013.01); *B60K 6/22* (2013.01); *B60K 7/0007* (2013.01); *B62D 61/12* (2013.01); *F41H 5/013* (2013.01); *F41H 7/048* (2013.01); *B60G 7/001* (2013.01); *B60G 17/00* (2013.01); *B60G 2500/30* (2013.01); *B62D 55/06* (2013.01); *B62D 55/24* (2013.01)

(58) Field of Classification Search
CPC ...... B62D 63/025; B62D 61/12; B62D 55/06; B62D 55/24; B60K 6/22; B60K 7/0007; F41H 5/013; F41H 7/048; B60G 7/001; B60G 17/00; B60G 2500/30
See application file for complete search history.

(56) References Cited

U.S. PATENT DOCUMENTS

| | | |
|---|---|---|
| 3,297,926 A | 1/1967 | Campbell et al. |
| 3,416,845 A | 12/1968 | Scanland |

(Continued)

FOREIGN PATENT DOCUMENTS

| | | |
|---|---|---|
| WO | 2014127767 | 8/2014 |
| WO | 2019169274 | 9/2019 |

OTHER PUBLICATIONS

Mackarvich, Dustin Sloan; International Search Report and Written Opinion for PCT Application No. PCT/US19/20313, filed Mar. 1, 2019, dated Jun. 14, 2019, 11 pgs.

*Primary Examiner* — Bryan A Evans
(74) *Attorney, Agent, or Firm* — Taylor English Duma LLP

(57) ABSTRACT

A modular military vehicle and a method for using a modular military vehicle is disclosed. The modular military vehicle can comprise a vehicle hull; a crew module removably mounted to the vehicle hull; a plurality of wheels mounted to the vehicle hull, the plurality of wheels comprising at least one driven wheel; and an electric drive system configured to drive the at least one driven wheel.

18 Claims, 25 Drawing Sheets

(51) Int. Cl.
*B60G 7/00* (2006.01)
*B60G 17/00* (2006.01)
*B62D 55/06* (2006.01)
*B62D 55/24* (2006.01)

(56) References Cited

U.S. PATENT DOCUMENTS

| | | | | |
|---|---|---|---|---|
| 5,934,397 | A * | 8/1999 | Schaper | B60G 3/01 180/65.245 |
| 7,104,581 | B2 * | 9/2006 | Chernoff | B60G 3/18 296/35.3 |
| 7,441,809 | B1 * | 10/2008 | Coombs | B62D 21/03 280/124.11 |
| 7,527,293 | B1 * | 5/2009 | Wang | B62D 1/10 200/61.54 |
| 2004/0163863 | A1 | 8/2004 | Beck et al. | |
| 2005/0284672 | A1 | 12/2005 | Egen et al. | |
| 2008/0017426 | A1 * | 1/2008 | Walters | B60L 58/21 180/89.1 |
| 2008/0245593 | A1 | 10/2008 | Kim | |
| 2010/0163330 | A1 | 7/2010 | Halliday | |
| 2013/0118000 | A1 | 5/2013 | Florus et al. | |
| 2015/0268009 | A1 * | 9/2015 | Tunis | B43L 1/00 89/36.02 |
| 2017/0158267 | A1 * | 6/2017 | Boivin | B62D 55/084 |

\* cited by examiner

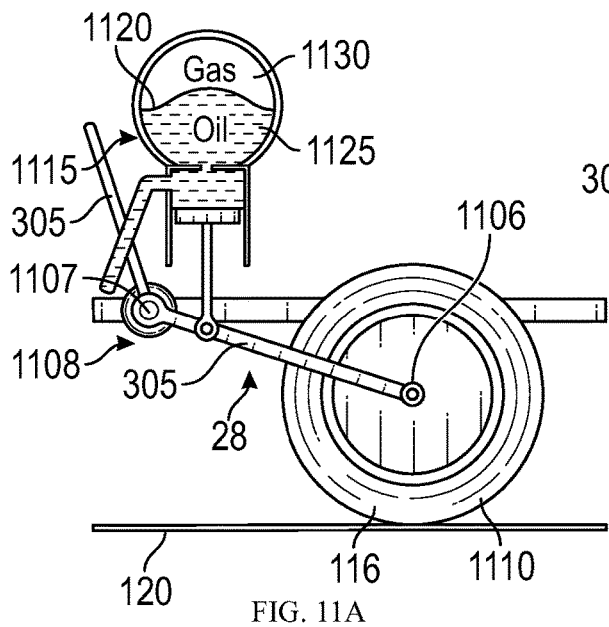
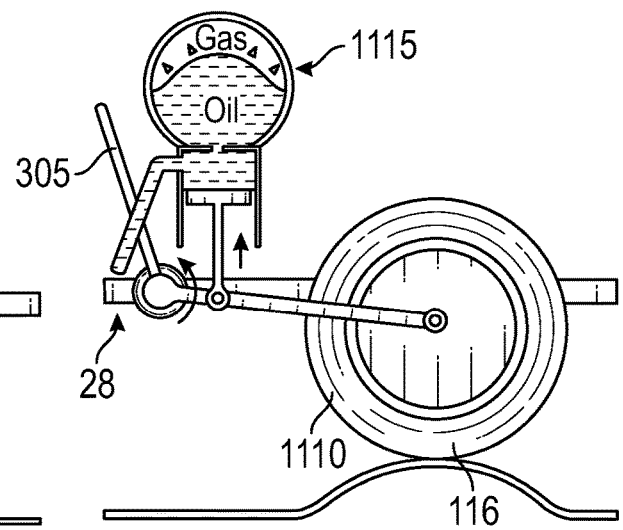
FIG. 11A  FIG. 11B
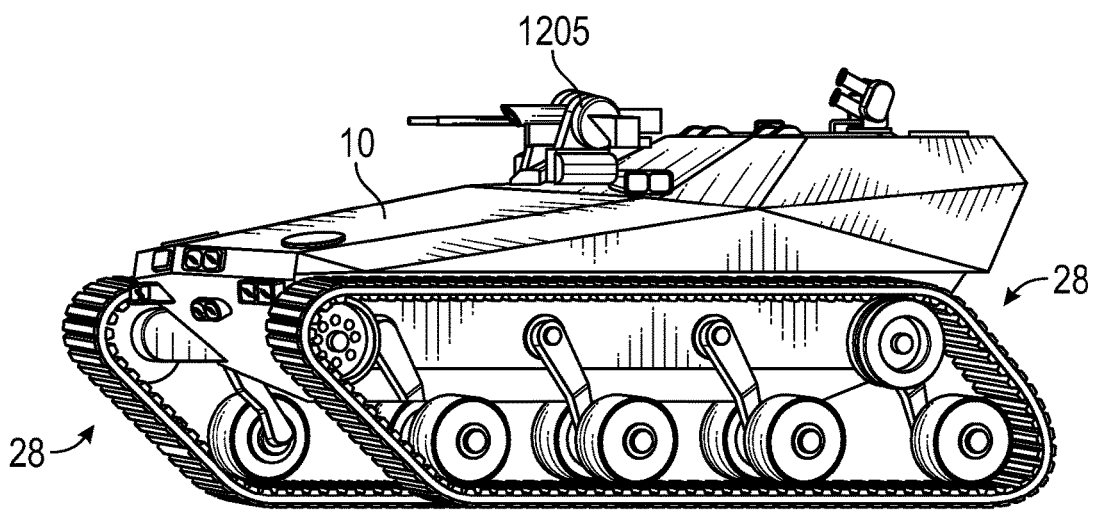
FIG. 12A
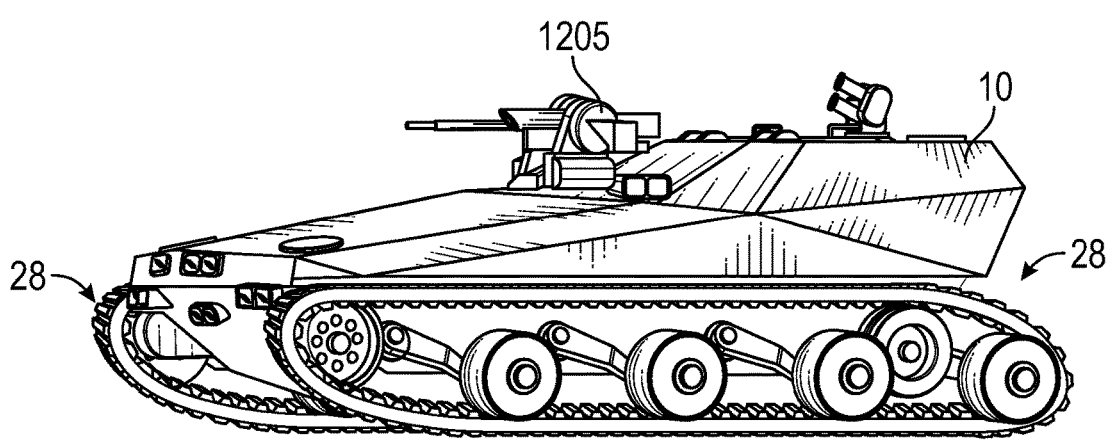
FIG. 12B Drive Wheel Torque and Power Curves (for various vehicle weights, w.4 drive wheels)

Drive Wheel Torque and Power Curves (for various number drive wheels, w. 8 tons)

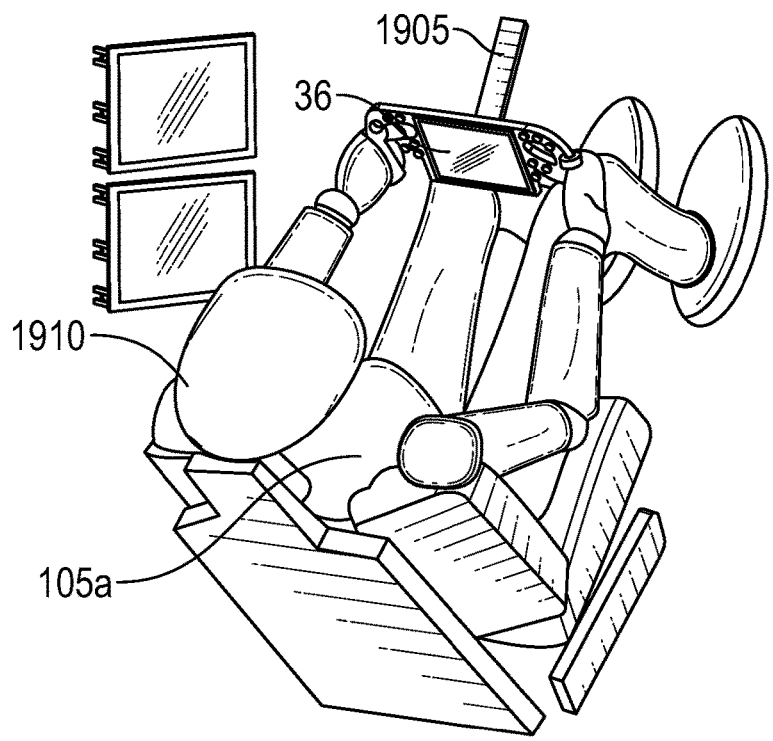
FIG. 19A
FIG. 19B

MODULAR MILITARY VEHICLE

CROSS-REFERENCE TO RELATED APPLICATIONS

The present application claims priority to U.S. Provisional Application No. 62/637,153 filed Mar. 1, 2018, which is hereby specifically incorporated by reference herein in its entirety.

TECHNICAL FIELD

This disclosure relates to a mobile, modular military support platform. More specifically, this disclosure relates to a military vehicle comprising a plurality of modules that can be interchanged as desired.

BACKGROUND

Conventional military tanks are complex, inefficient, and not robust. For example, as technology advances, conventional tanks either fall behind or require extensive reworking to bring up to date. On the battlefield, an enemy hit can destroy a track of the conventional tank and render the tank inoperable. Heavy weights of the conventional tank can make the tank difficult to transport and expensive to operate. Further, crew members of conventional tanks can be placed in dangerous position on the tank in order to operate the tank.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a modular military vehicle comprising a vehicle hull; a crew module removably mounted to the vehicle hull; a plurality of wheels mounted to the vehicle hull, the plurality of wheels comprising at least one driven wheel; and an electric drive system configured to drive the at least one driven wheel.

Also disclosed is a military vehicle comprising a vehicle hull; a plurality of wheels mounted to the hull, the plurality of wheels comprising at least one driven wheel; an electric drive system configured to drive the at least one driven wheel; and a suspension system configured to selectively elevate at least one of the driven wheels.

A method for using a modular military vehicle is also disclosed, the method comprising providing the modular military vehicle comprising a vehicle hull, an alignment pin, and a plurality of wheels mounted to the vehicle hull, the plurality of wheels comprising at least one driven wheel; aligning a receiver of one of a weapons module and a crew module with the alignment pin; and engaging the alignment pin with the receiver to mount the one of a weapons module and a crew module to the hull.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, and features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

FIGS. 11A-11B are schematic views of a suspension system of the support vehicle of FIG. 1A.

FIG. 12A is a perspective view of the support vehicle of FIG. 1A in a normal position.

FIG. 12B is a perspective view of the support vehicle of FIG. 1A in a crouched position.

FIG. 19A is a perspective view of a crew member using a controller that is disconnected from of the support vehicle of FIG. 1A.

FIG. 19B is a perspective view of a crew member using the controller of FIG. 19A, wherein the controller is connected to the support vehicle of FIG. 1A.

DETAILED DESCRIPTION

Figure 1A:
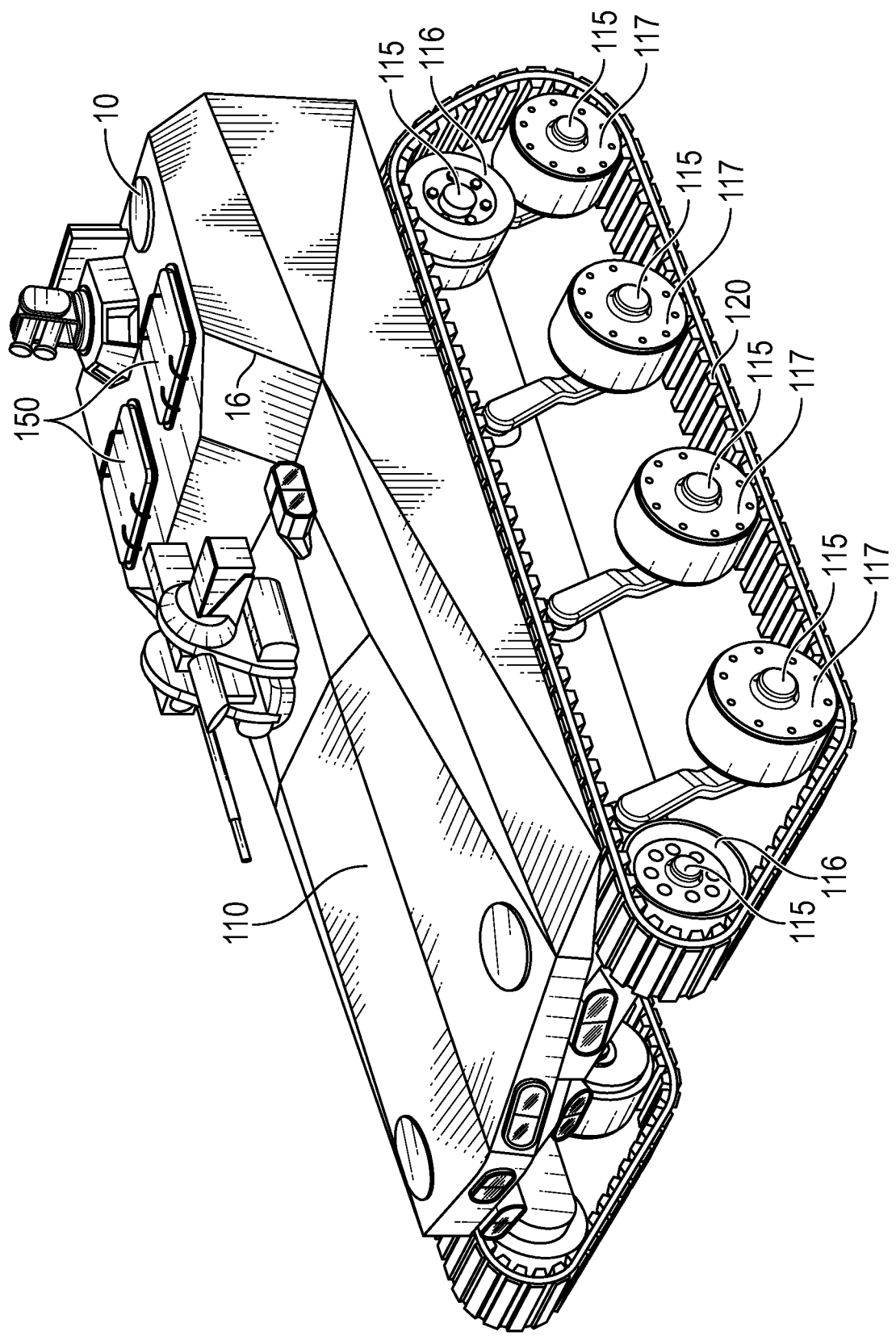
FIG. 1A is a perspective view of a modular military support vehicle, according to one aspect.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements, and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a mobile, modular military support platform, and associated methods, devices, and various apparatus. In the current aspect, the support platform is a vehicle, though other modular support platforms are contemplated as within the scope of this disclosure. The vehicle can comprise a plurality of interchangeable modules that can be positioned on a hull of the vehicle, as desired. The vehicle can be powered by an engine, a generator and/or battery packs. It would be understood by one of skill in the art that the disclosed military vehicle is described in but a few exemplary embodiments among many. No particular terminology or description should be considered limiting on the disclosure or the scope of any claims issuing therefrom.

Figure 1B:
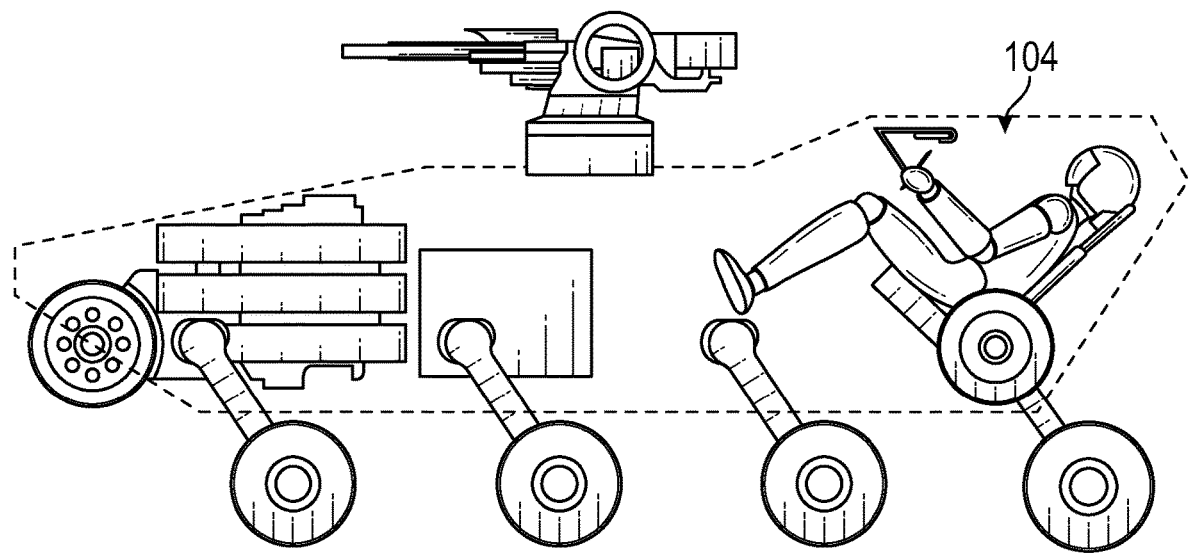
FIG. 1B is a side elevational schematic view of the support vehicle of FIG. 1A.
Figure 1C:
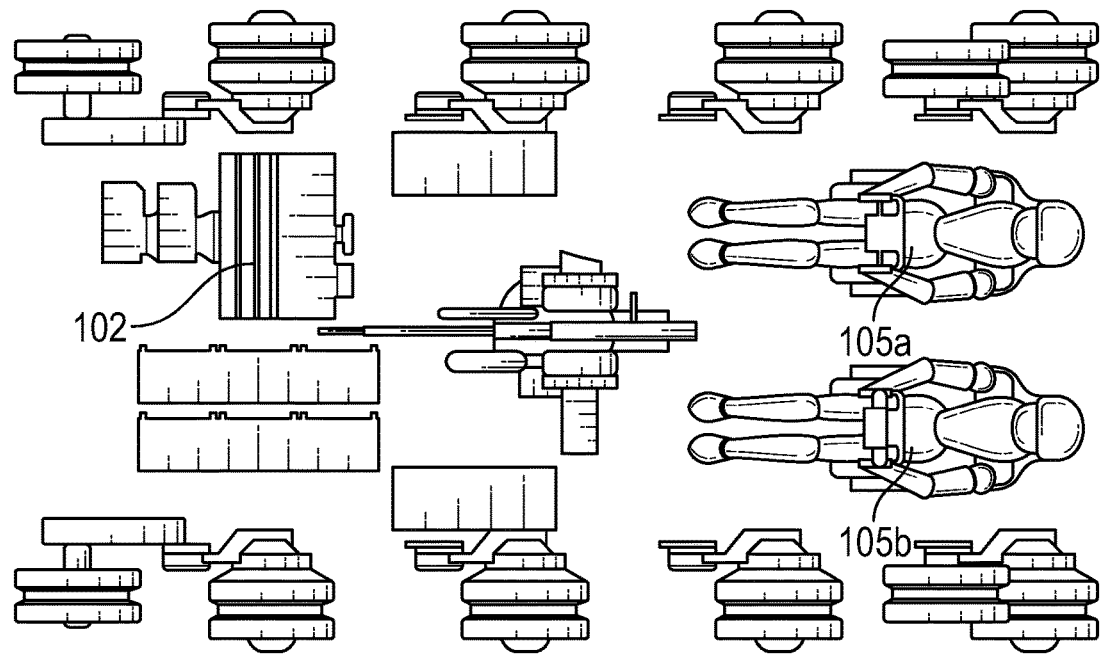
FIG. 1C is top plan schematic view of the support vehicle of FIG. 1A.
Figure 10:
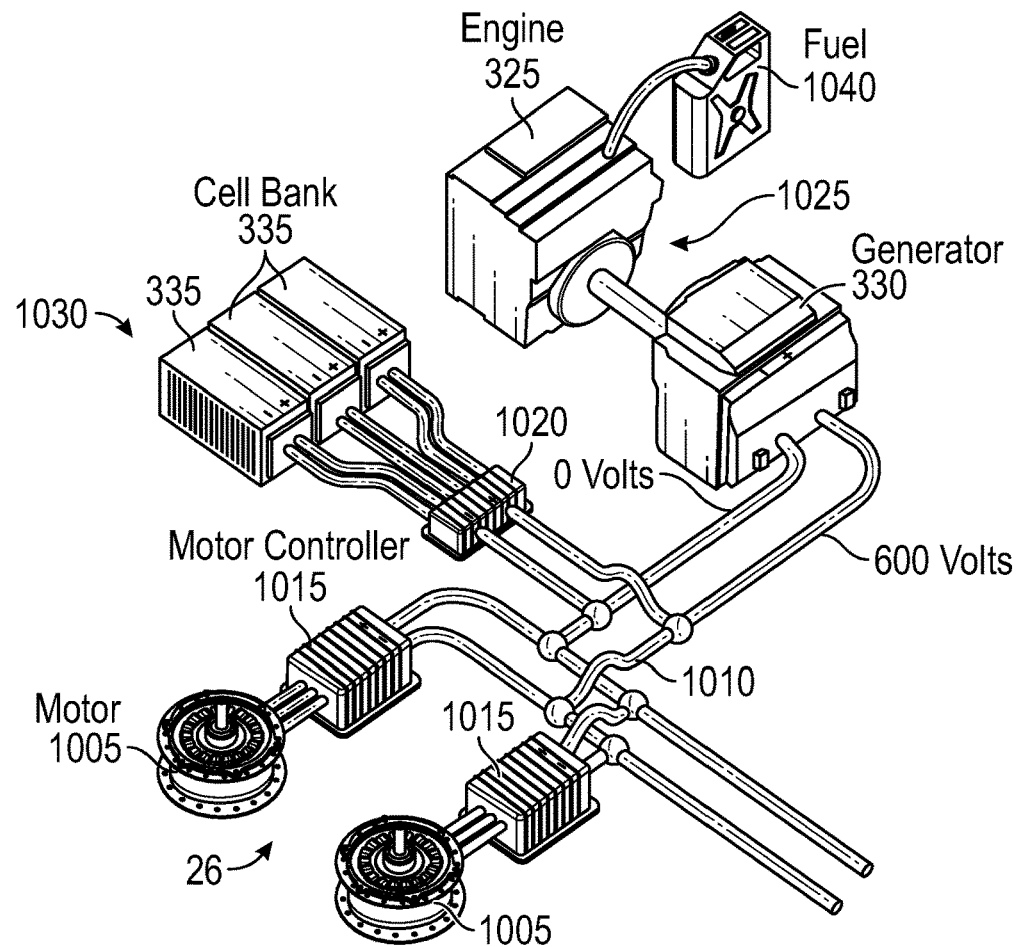
FIG. 10 is a schematic view of a serial hybrid drivetrain of the support vehicle of FIG. 1A.
Figure 12C:
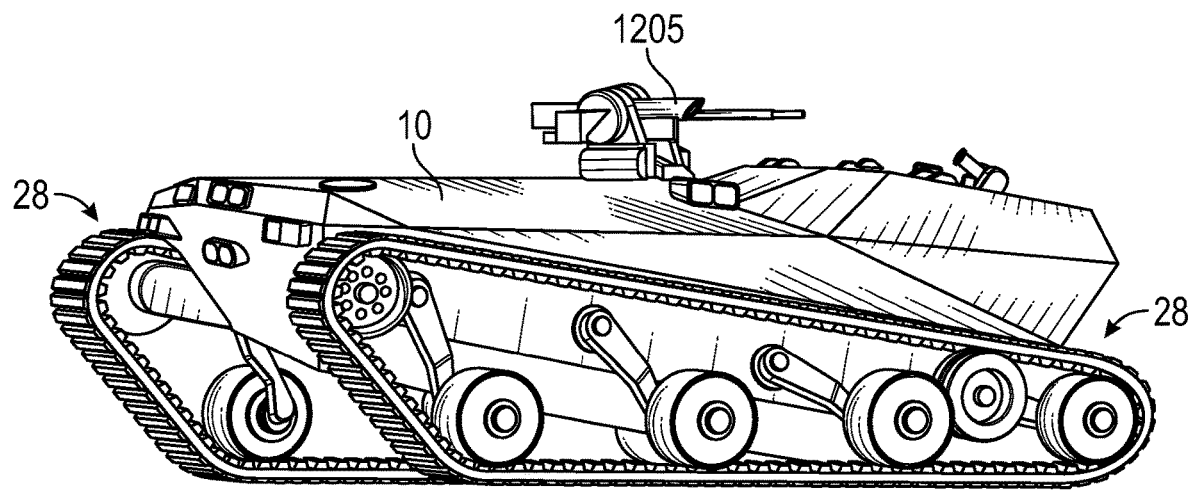
FIGS. 12C-12D are perspective views of the support vehicle of FIG. 1A in various elevation positions.
Figure 12D:
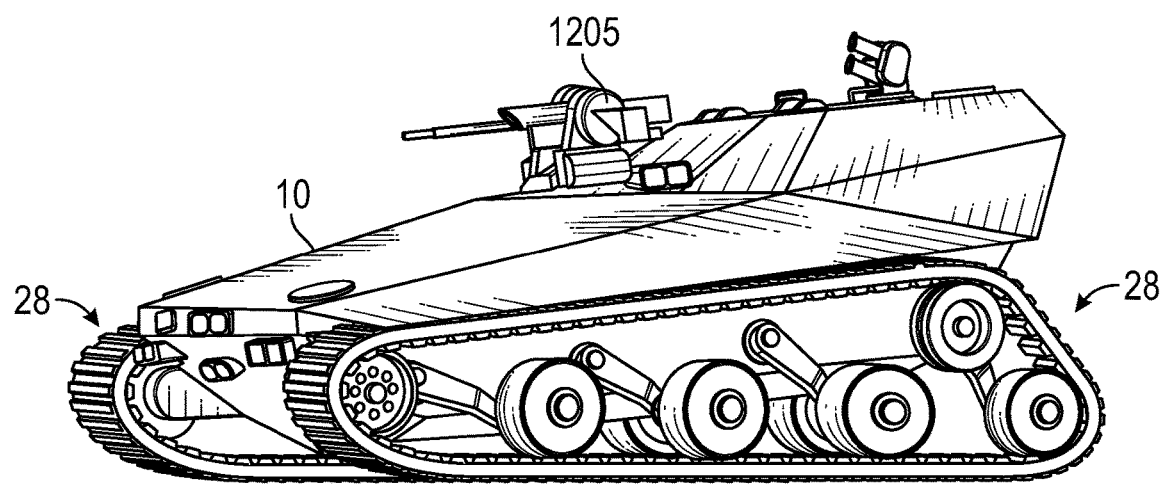

As illustrated in FIGS. 1A-C, a modular military vehicle 10 can be configured for a crew of two crew members 105a,b and can comprise a hybrid electric drive system 102 based on hub motors 1005 (shown in FIG. 10). According to example aspects, the crew can reside in a crew compartment 104 of a crew module 16. The crew can enter the crew compartment 104 through one or more hatches 150 in the crew module 16. Such an electric drive system 102 can reduce the volume required within a hull 110 of the vehicle 10 for a serial hybrid drivetrain (not shown) of the electric drive system 102, allowing for a smaller and lighter vehicle 10 when compared to conventional military vehicles. In some aspects, as shown, the hull 110 can be a V-hull. Example aspects of the vehicle 10 can comprise a number of wheels 115. The wheels can engage a track 120, as shown. In some aspects, all of the wheels 115 can be driven wheels 116 (shown in FIG. 13A), and in other aspects, some of the wheels 115 can be driven wheels 116 and the remaining wheels 115 can be idler wheels 117 that are not driven. In the present aspect, all the idler wheels 117 are road wheels that can engage a ground portion of the track 120 adjacent a ground surface. The number of driven wheels 116 can vary based on the desired vehicle characteristics, such as length, weight, and expected terrain. For example, in some aspects, between about 4 and 8 of the wheels 115 can be driven wheels 116. Such a layout can allow for redundancy and the ability to limp home with a destroyed or damaged track 120 and at least one damaged or destroyed hub motor 1005 (shown in FIG. 10) on either side. According to example aspects, a height of the vehicle 10 can be less than about 8.5 feet and a width of the vehicle 10 can be less than about 9.5 feet. In one aspect, a length of the vehicle 10 can be less than about 19 feet. Optionally, in other aspects and depending on the modules as described below, the length of the vehicle 10 can be about 19 feet or greater than 19 feet.

Figure 2A:
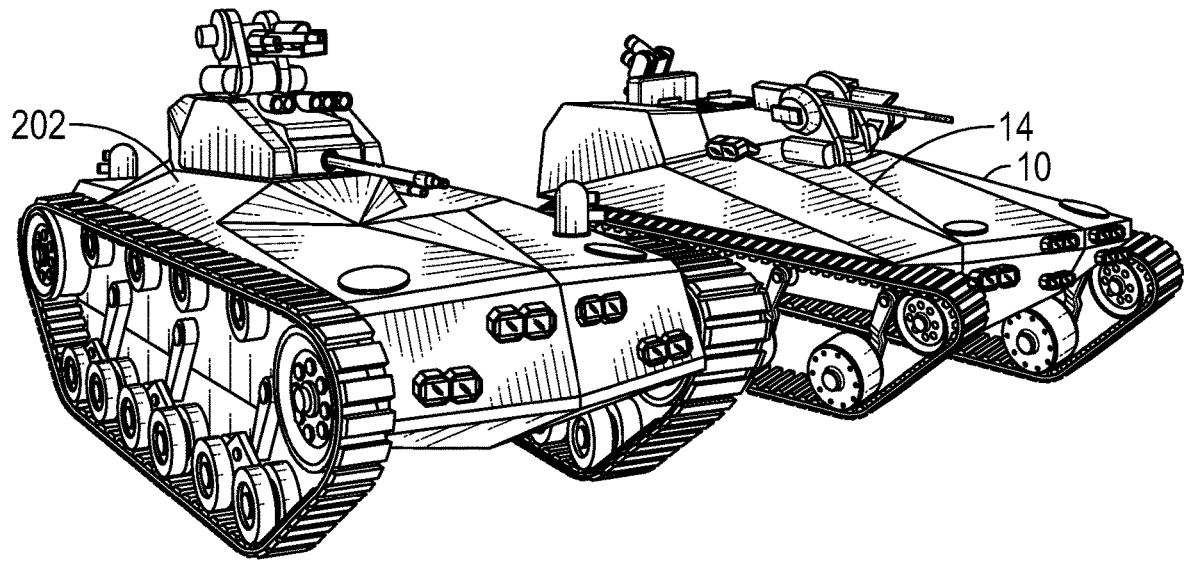
FIG. 2A is a perspective view of the support vehicle of FIG. 1A compared to a conventional tank.
Figure 2B:
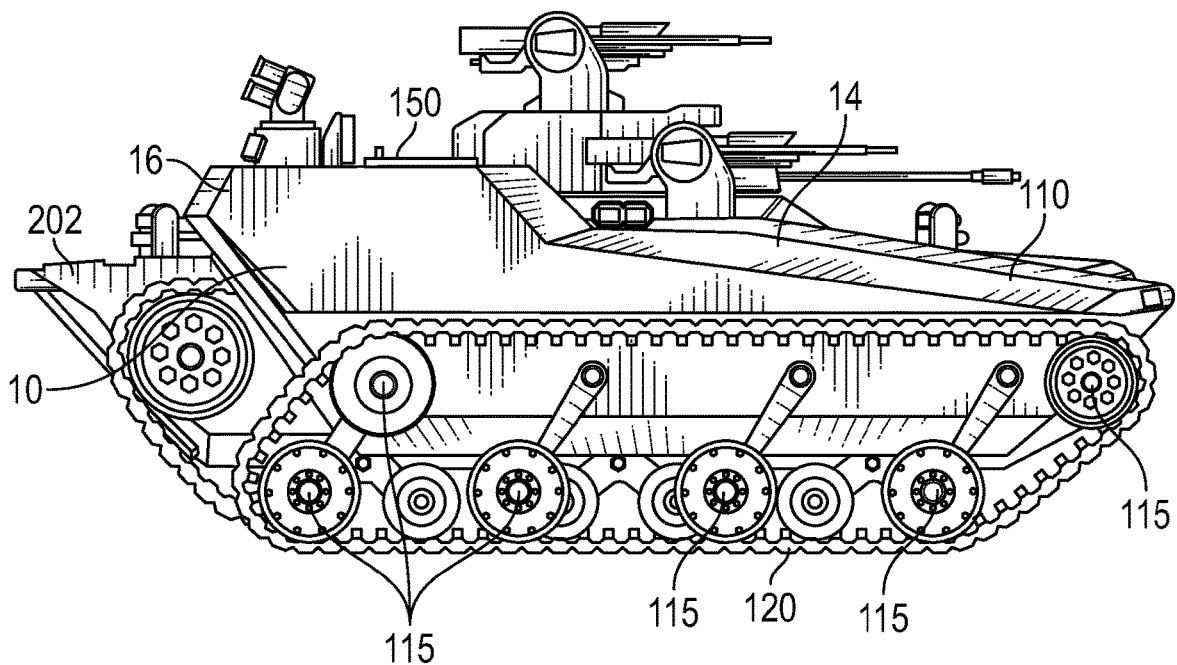
FIG. 2B is a side elevational view of the support vehicle of FIG. 1A compared to a conventional tank.

FIGS. 2A-B are side-by-side design comparisons of a prior art design for a conventional military vehicle 202 and the vehicle 10 of the present disclosure. In one aspect, the length of the current vehicle 10 can be about three feet shorter than the prior art design for a conventional military vehicle 202. In another aspect, the current vehicle 10 can weigh significantly less than the conventional military vehicle 202.

By transitioning the layout of the vehicle 10 to be a two-person configuration, as opposed to a conventional three-man configuration, and by transitioning the vehicle 10 from a traditional drivetrain to the serial hybrid drivetrain, significant volume and weight reductions can be achieved in conjunction with increased capabilities. The volume of the overall vehicle 10 as well as the volume around the crew (i.e., crew members 105a,b) can be significantly smaller than conventional military vehicles, such as the prior art design for a convention military vehicle 202 shown herein. This can significantly reduce the amount of armor 1605 (shown in FIG. 16) needed and therefore can reduce the weight. Additionally this can allow the length of the vehicle 10 to also be compressed. The drivetrain transformation can move the motors 1005 (shown in FIG. 10) to the driven wheels 116 and can remove the need for a transmission. Without a transmission, internal space can be freed and can allow for the vehicle 10 to again be reduced in size. In some aspects, the track 120 can be a composite band track and a generator 330 (shown in FIG. 3) can be an on-board electric generator, which can enable significant vehicle noise reduction during movement. Batteries 335 (shown in FIG. 3) can also provide the ability to be silent for long periods of time without running an engine 325 (shown in FIG. 3) of the vehicle 10.

In one aspect, the vehicle 10 can comprise a plurality of modules. Each module positioned on the vehicle 10 can be adapted and upgraded with the latest technology and weapon platforms without redesigning and retooling the entire vehicle 10. This can be accomplished through two main modular compartments within the vehicle 10, the crew module 16 and a weapons module 14. Serviceability can also greatly improved since each module can be removed and serviced independent from the overall vehicle 10.

Figure 3:
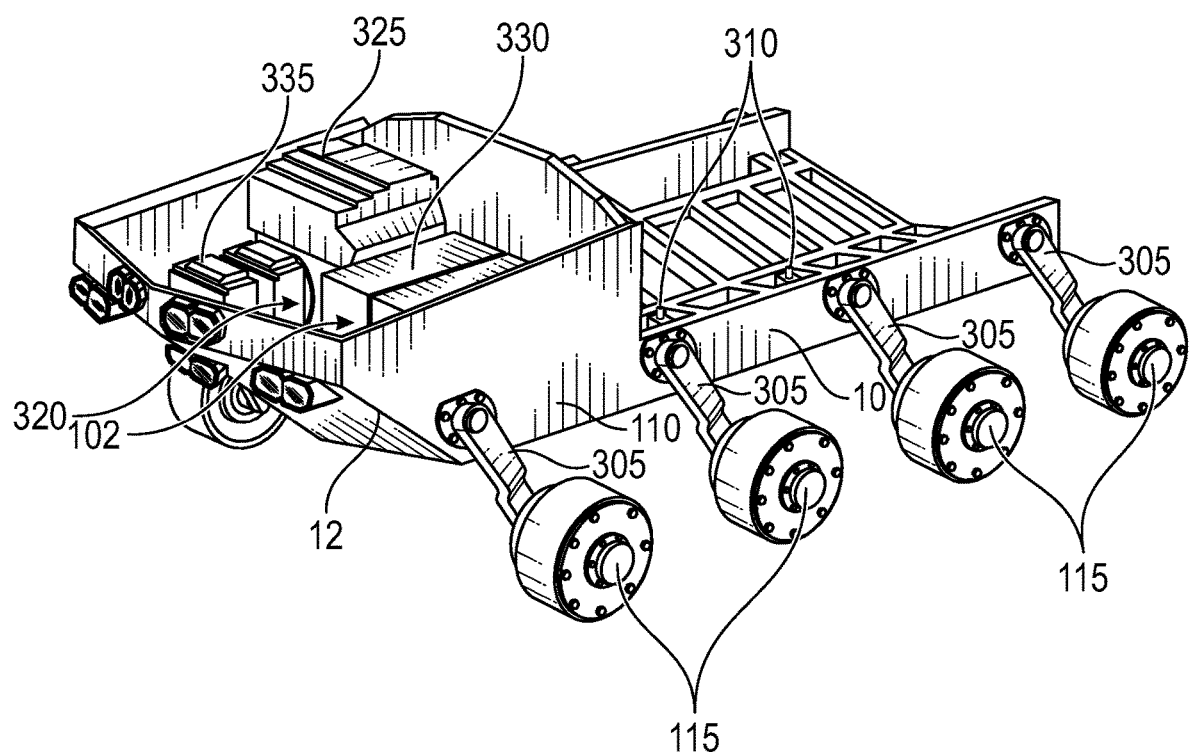
FIG. 3 is a perspective view of a portion of the support vehicle of FIG. 1A, showing a sled coupled to a hull of the vehicle.

Referring to FIG. 3, the vehicle 10 can be a modular platform or system with several interchangeable modules or compartments that can be configured based on the mission requirements. In one aspect and as illustrated in FIG. 3, the support vehicle can comprise a driveline sled 12 that forms the backbone of the modular system. In this aspect, the driveline sled 12 can comprise the v-hull 110, the electric drive system 102, the trailing arms 305, wheels 115, and the track 120. Hard mounting points and alignment pins 310 can also be built into the sled 12 for attaching the required modules.

Example aspects of an engine bay 320 of the vehicle 10 can comprise a diesel engine 325, an electric generator 330, and at least one battery 335. In use, the diesel engine 325 can spin the electric generator 330 to power the driven wheels 116 and to keep the battery or batteries 335 charged. Modular batteries 335 can be placed within the engine bay 320 in front of a crew compartment 104 (shown in FIG. 1B). As a modular system, the vehicle 10 can operate in an engine mode without batteries 335, or conversely, entirely on battery power in a battery mode (for a limited duration).

Figure 4:
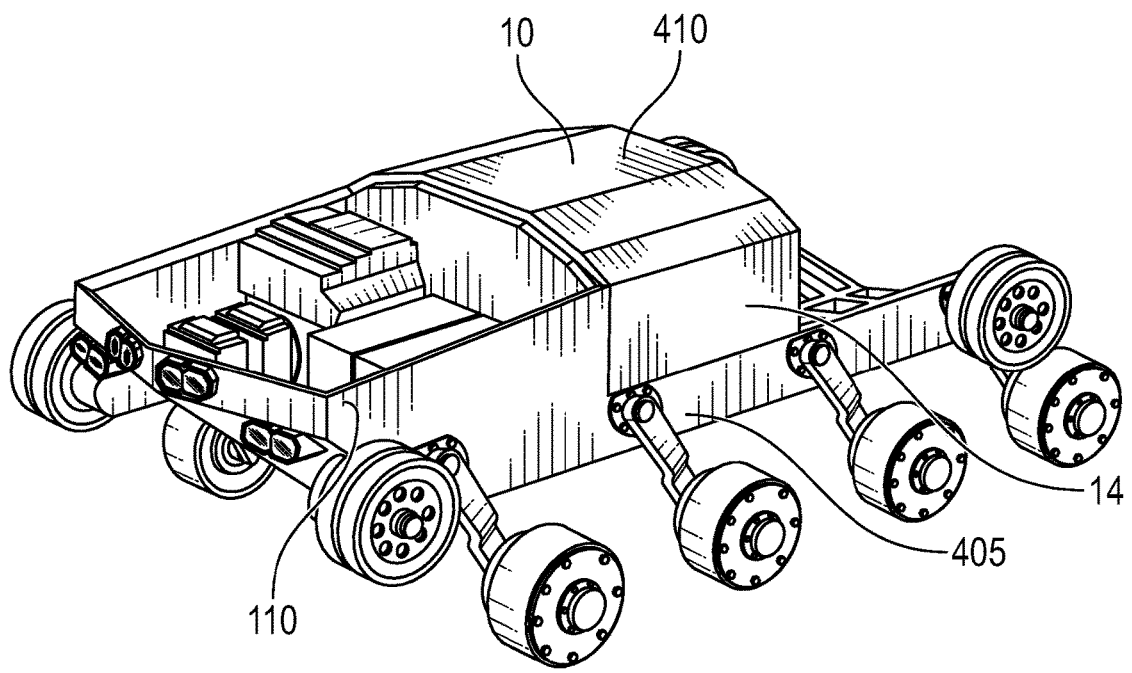
FIG. 4 is a perspective view of a portion of the support vehicle of FIG. 3, showing a weapons module coupled to the vehicle.

The weapons module 14, illustrated in FIG. 4, can be a hollow compartment positioned near or adjacent to a middle 405 of the vehicle 10 that can house a main offensive weapon (not shown) for the vehicle 10. Various sized shells with unique mounting patterns can be incorporated based off the weapon configurations. A remote weapon station system can be attached to a top 410 of the weapons module 14 with no need to consume internal space. However, for auto-reload systems, internal space can be consumed. According to example aspects, the overall size of the weapons module space can be about 42 inches in diameter×about 24 inches tall, which can accommodate most potential weapon offerings.

Figure 5:
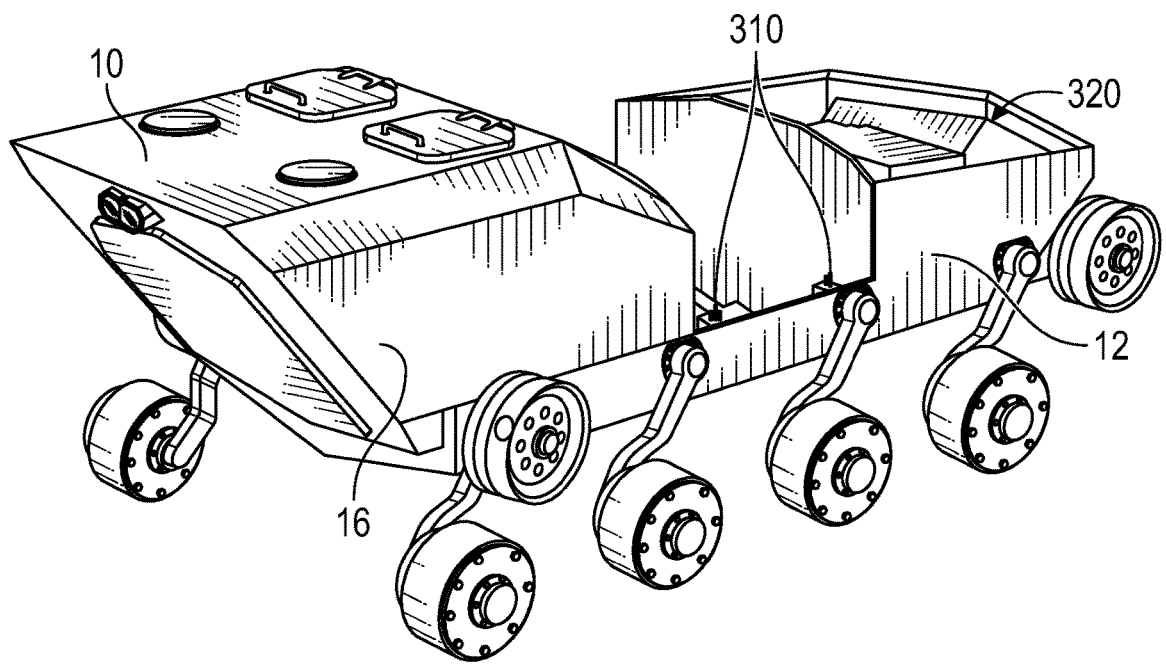
FIG. 5 is a perspective view of a portion of the support vehicle of FIG. 3, showing a crew module coupled to the vehicle.

The crew module 16 is illustrated in FIG. 5. The crew module 16 can allow the crew compartment 104 (shown in FIG. 1) to be easily upgraded with various layouts and communication equipment. Outdated crew compartments 104 can be removed, and newer crew compartments 104 can be retrofitted without an extensive overhaul and without extensive downtime. A removable crew compartment 104 can also be necessary to facilitate future configurations which are outlined below.

Each of the modules, such as the weapons module 14 (shown in FIG. 2) and the crew module 16, can be designed with lift points and can be removed via a vertical lift assist. For example, in one aspect, an overhead crane and standard rigging attachments can be all that is required to remove and replace each of the modules (e.g., the weapons and crew modules 14,16). Access panels can be dispersed around the vehicle 10 as needed to hide the various bolting patterns and lift points needed to remove and replace modules. This can help preserve the stealth appearance of the vehicle.

In some aspects, brackets and fasteners can be used appropriately to join the various modules together. The various brackets and joint designs can be optimized to handle a load path and shearing forces induced on the joints as a result of blast events and kinetic impacts. Large alignment pins 310 can be used to aid maintenance crews in aligning the modules into their correct locations. These alignment pins 310 can mitigate assembly issues and ensure that the various bolting patterns align, thus expediting the time associated with replacing modules. For example, one or more of the alignment pins 310 can engage a receiver (not shown) on a corresponding module (e.g., the weapons module 14 or crew module 16) to mount the module on the vehicle 10. This design methodology is consistent with the way engines are aligned and assembled into consumer vehicles.

Figure 6:
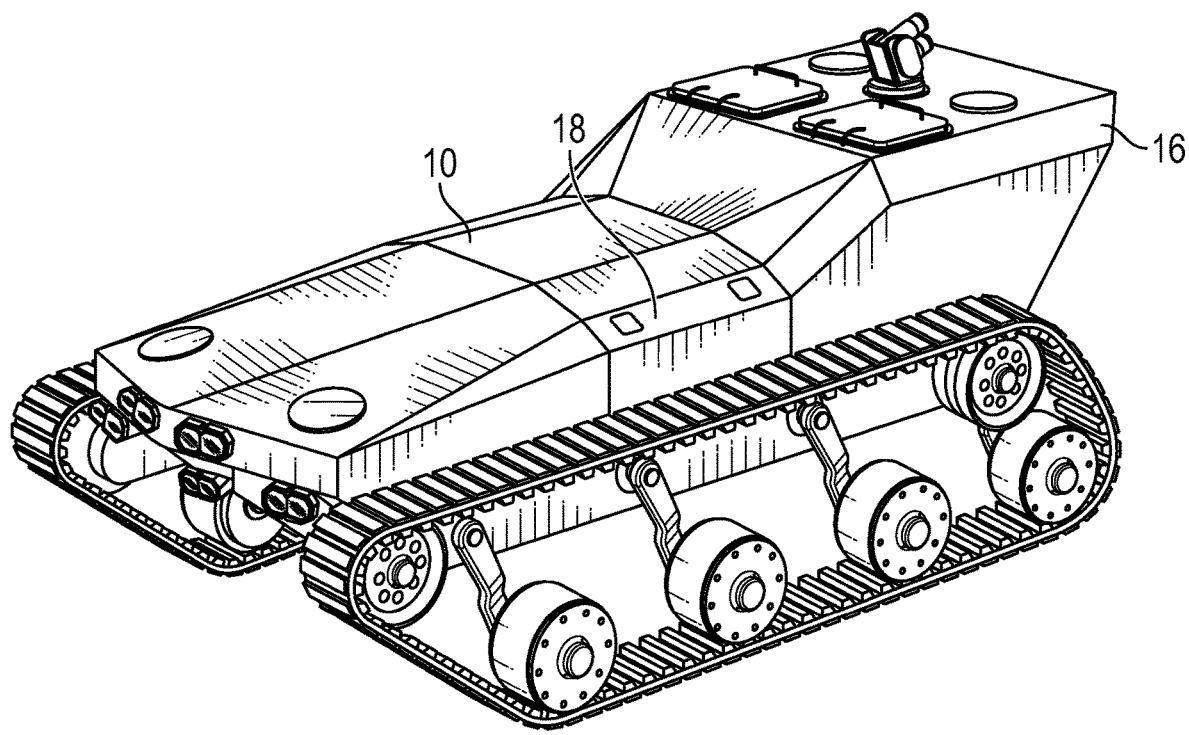
FIG. 6 is a perspective view of the support vehicle of FIG. 1A, in which the weapons module has been replaced with a battery module.

Because of the modular nature of the vehicle 10, other future modules could be designed and used on the standard driveline sled 12. For example, and as illustrated in FIG. 6, the weapons module 14 (shown in FIG. 2) could be replaced with a battery module 18 comprising additional battery packs for the vehicle 10. Since the vehicle 10 comprises an electric hybrid drive system 102 (shown in FIG. 1), at full charge, the additional battery packs can allow for greater endurance without the use of the engine 325 (shown in FIG. 3) or generator 330 (shown in FIG. 3). The battery module 18 can also allow for about 3 to 4 times the standard vehicle specified 'silent watch' periods. This extended silent watch capability can allow the vehicle 10 to remain on watch for many hours on surveillance missions.

Figure 7:
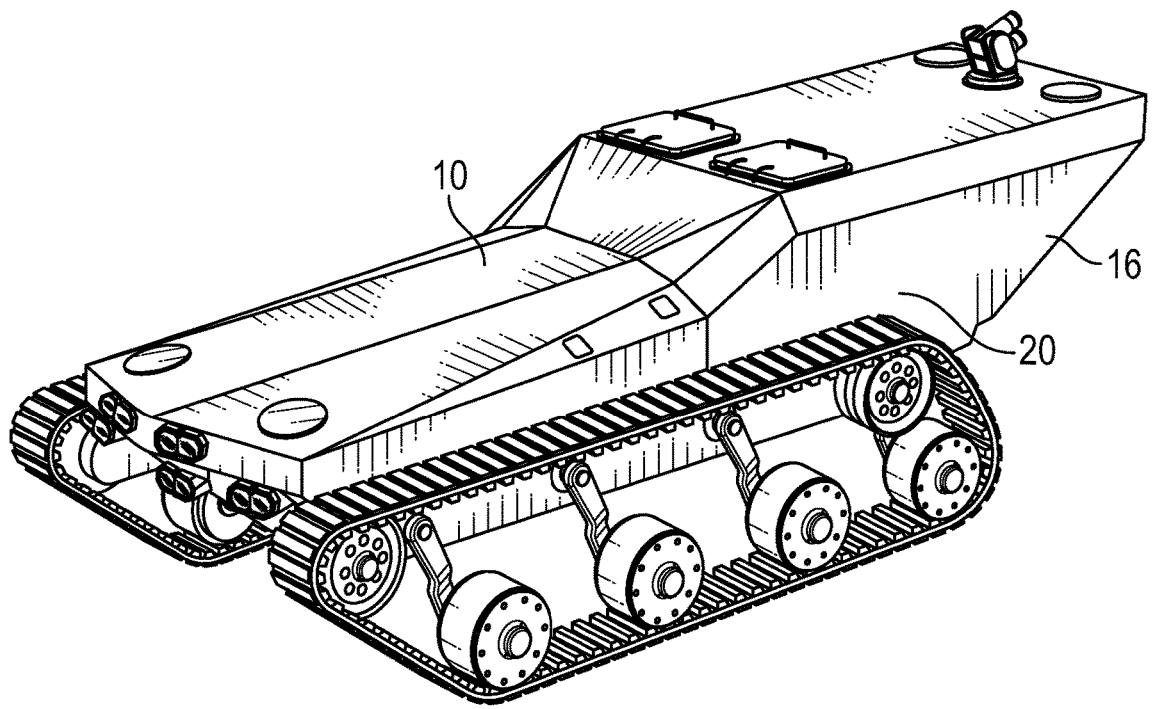
FIG. 7 is a perspective view of the support vehicle of FIG. 1A, in which the weapons module has been replaced with an extended crew module.

In another example, illustrated in FIG. 7, the vehicle 10 can comprise an extended crew module 20 that makes use of the space from at least one of the weapons module 14 (shown in FIG. 2) and the crew module 16. This larger extended crew module 20 can allow the vehicle 10 to be used as an armored personnel carrier and deliver personnel to the front lines at a rapid speed. The extended crew module 20 can carry, for example, up to 6 persons and can also comprise a remote driver.

Figure 8:
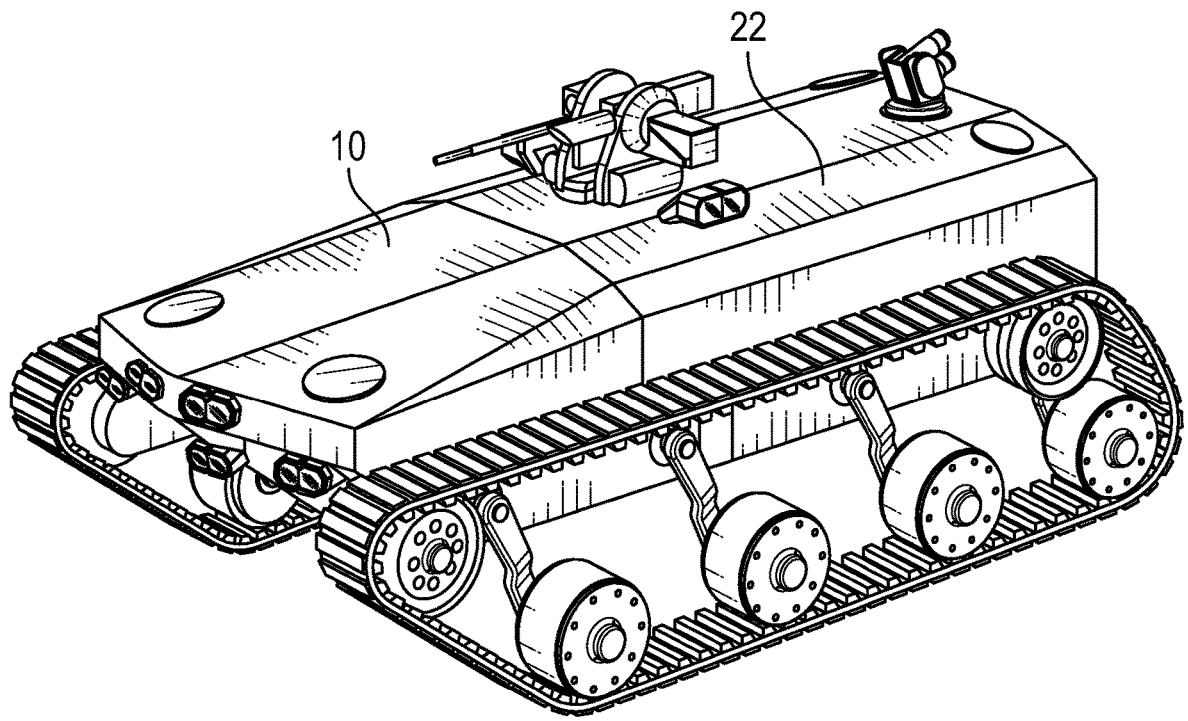
FIG. 8 is a perspective view of the support vehicle of FIG. 1A, in which the weapons module has been replaced with an expanded weapons module.

In still another example, the crew module 16 (shown in FIG. 1) can be completely removed, and the vehicle can comprise a second weapons module and/or an expanded weapons module 22 as illustrated in FIG. 8. Necessary electronics and communications equipment within the expanded weapons module 22 can allow for the vehicle 10 to operate unmanned and to be controlled from a remote operating site. An unmanned vehicle 10 with an expanded weapons module 22 can allow a significant increase in lethality of the vehicle 10 while also keeping soldiers (e.g., crew members 105*a,b*—shown in FIG. 1) out of danger.

Figure 9A:
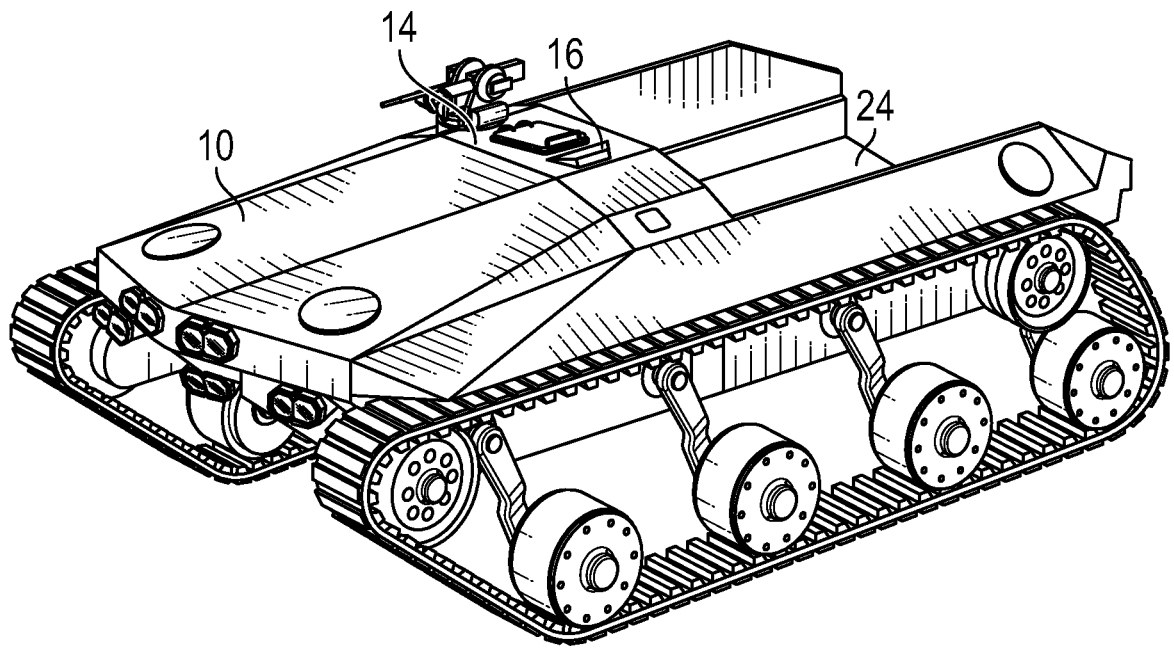
FIG. 9A is a perspective view of the support vehicle of FIG. 1A, in which the crew module has been replaced with an open bed.
Figure 9B:
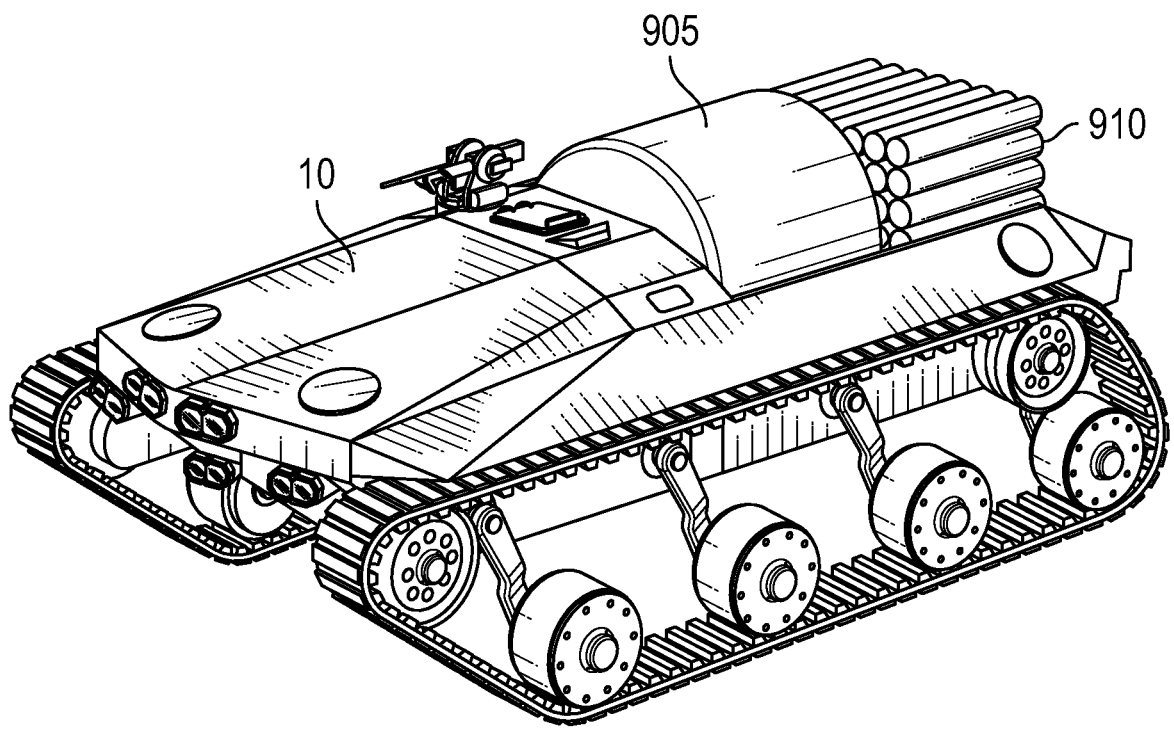
FIG. 9B is a perspective view of the support vehicle of FIG. 1A, wherein the open bed of FIG. 9A supports an ammunition pallet and a fuel container.
Figure 9C:
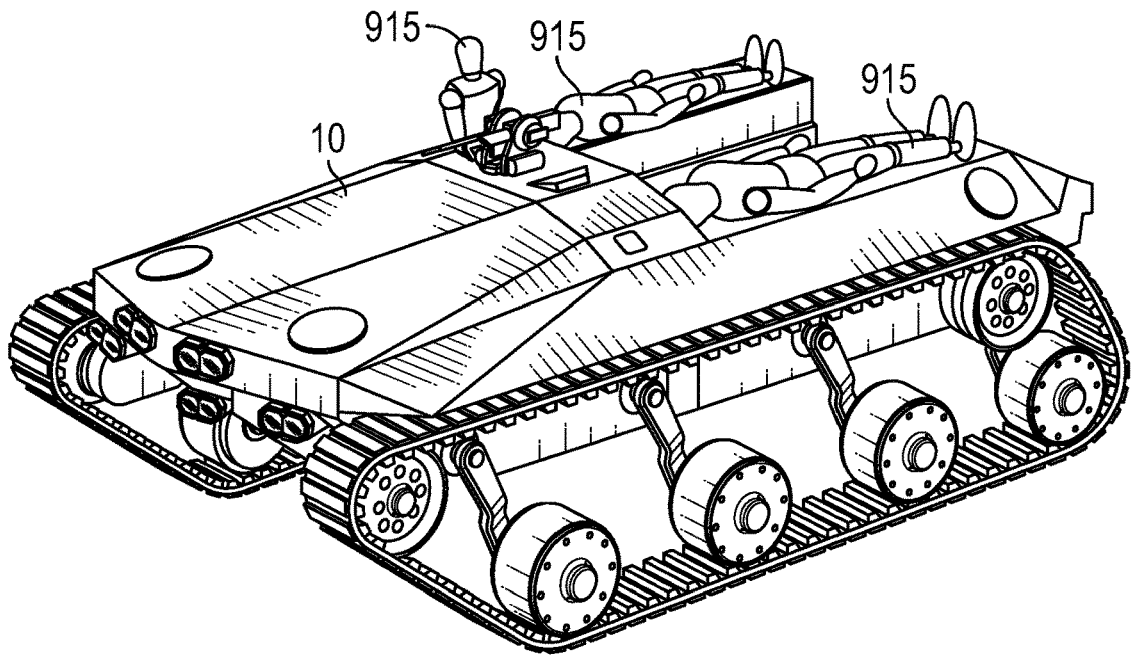
FIG. 9C is a perspective view of the support vehicle of FIG. 1A, wherein the open bed of FIG. 9A supports injured soldiers.

With reference to FIG. 9A, in another example, the crew module 16 (shown in FIG. 1) can be removed and the vehicle 10 can comprise an open bed 24. The bed 24 can hold supplies and/or personnel, such as an ammunition pallet 905 and a fuel container 910, as illustrated in FIG. 9B. The bed 24 can also carry up injured persons, such as injured soldiers 915, to transport them out of a battle zone as shown in FIG. 9C. In one aspect, to accommodate the bed 24, the weapons module 14 can be replaced by a smaller weapons module. In some aspects, the vehicle 10 can be an autonomous or remote controlled vehicle. Furthermore, in some aspects, a hydropneumatic suspension system can be used to lower the vehicle 10 for easier loading and unloading.

The modularity of the vehicle 10 can allow the vehicle 10 to remain in operation for decades. Not only can servicing the vehicle 10 be simpler when compared to conventional vehicles, the modularity allows for a variety of modules/mission platforms to be incorporated. Future battle plans could involve a variety of vehicles with unique missions working in tandem on the battlefield. The modular vehicle 10 can be able to adapt to any future battlefield and stay relevant and modern for the foreseeable future.

Referring now to FIG. 10, to turn fuel from a fuel tank 1040 into controlled motion, the vehicle 10 (shown in FIG. 1) can comprise a serial hybrid drivetrain 26 comprising the diesel engine 325, the electric generator 330, the battery packs and/or batteries 335, and the in-hub electric motors 1005 within multiple wheels 115 (i.e., the driven wheels 116). In the serial hybrid-electric drivetrain 26, there can be no mechanical connection between the hydrocarbon-burning diesel engine 325 and the driven wheels 116 and/or sprockets (not shown). The engine 325 can be mechanically connected to the generator 330 (or an array of generators), which can supply power to a common bus 1010. To reduce weight and currents, higher voltages can be desired. As voltage is increased, however, safe operation can require more sophisticated technologies and safety interlocks. In one aspect, for efficiency and safety, the voltage can be about 600 volts DC.

Electronic controllers can be provided which can control various aspects of the serial hybrid drivetrain 26. For example, a motor controller 1015 can be attached to each of the motors 1005 and to the common bus 1010. Also attached to the common bus 1010 can be a battery controller 1020, which can use excess energy (from the generator 330 or motor regeneration) to charge the batteries 335. In situations where the vehicle 10 needs to expend more power than the generator 330 can supply, the batteries 335 can supply power to the system. The parallel nature of the system allows the vehicle 10 to operate on battery power with an inactive generator, at least for a limited time.

The components can be specified to balance mission objectives, performance targets, weight, cost, and engine-off range. The engine-generator system can be modular and the battery system can be module. For example, a first power module 1025 can comprise the engine 325 and the generator 330, and a second power module 1030 can comprise the battery 335. As such, any system that fits within the space of the engine bay 320 (shown in FIG. 3) that can generate 600V can be swapped in and out, as desired.

Based off current analysis, the following systems goals can be achieved with the current configuration. On level ground, the vehicle 10 can charge the batteries 335 at steady-state on-road cruise at 80 kph or cruise at 50 kph with batteries 335 only. On a hill, the vehicle 10 can maintain battery charge on a 20% grade (11°) at 40 kph (the potential energy alone requires 171 kW). In one aspect, the vehicle 10 can climb a 200 ft tall 100% grade without slowing below 35 kph (potential energy requires 4.9 Megajoules and greater than 505 kW of mechanical power can be expended by the hub motors 1005 for 9.6 seconds). In another aspect, the vehicle 10 can drive on 40% grades from the sides. The vehicle 10 can further comprise a cooling system (not shown) to effectively cool the vehicle 10 for steady-state climbing at 60% grade, assuming the hub motors 1005 are covered in 2 inches of mud. In another aspect, the vehicle 10 can climb a 200 ft tall 100% grade without slowing below 30 kph (greater than 505 kW of power can be expended by the engine 325 and batteries 335 for 9.6 seconds). In a further aspect, with charged batteries 335 and the engine 325 off, the vehicle 10 can cruise on level ground for 16 km at 50 kph or can be in silent watch (no movement, generator 330 off) for 8 hours. The vehicle 10 can have sufficient power to be able to tow another disabled vehicle on level terrain at a minimum speed of 25 kph.

In one aspect, there are no drive sprockets used to move the track 120 (shown in FIG. 1) and propel the vehicle 10. Instead, the vehicle 10 can comprise multiple wheels 115 (shown in FIG. 1) and traction can be generated through friction between the wheels 115 and the track 120. This distributes the friction through various points on the track 120 and can significantly reduce the stress on the composite band track 120. As an additional benefit, the vehicle 10 can be able to continue without a track 120 if required. The hub motors 1005 can be specified in a manner that affords redundancy. For example, multiple damaged motors 1005 could be electrically disconnected from the system and allowed to freewheel, such that the vehicle 10 can continue to operate with heavy damage, albeit at a reduced performance level.

According to one aspect, the hub motors 1005 can be outrunner switched reluctance motors. The reluctance motors contain no rare earth metals, require no commutator, can be made completely waterproof, offer high torque with no gear reduction, and are resistant to internal damage. In another aspect, the vehicle 10 can further comprise complex control electronics and inverter assemblies to control each motor 1005. Water cooling channels and power cables can be run through the trailing arms 305 of the wheels 115.

Due to performance requirements and a desired weight of less than 20,000 pounds, such as less than 18,000, less than 16,000 less than 14,000, less than 12,000, or less than 10,000 pounds, the generator 330 can be capable of producing 225-300 kW. The engine 325 can be a gasoline or a diesel engine due to fuel economy, low-RPM power, reduced noise, and fuel flexibility. In one aspect, the vehicle 10 can further comprise a turbine (not shown).

As the engine 325 is mechanically decoupled from the wheels 115, a few unique opportunities present themselves. For efficiency, the engine control strategy can be to hold a constant RPM regardless of torque (and consequently electrical power generation). With a constant RPM, the exhaust note can be tuned to passively cancel itself by a large amount. To tune the exhaust, runner lengths can be selected to keep the exhaust pulses evenly spaced when the pulses enter a turbocharger(s). After the turbocharger(s), the exhaust can be tuned to length and Helmholtz resonators can act to allow past exhaust pulses to cancel their successor exhaust pulses. These strategies can serve to reduce the low-frequency sound emissions from the engine 325. With a final muffler, the high-frequency overtones can be reduced as well. As a result, the vehicle 10 can have a smaller noise signature than typical military vehicles currently or previously in service. At full power, the engine 325 can likely emit much less than 45 dBA at 100 m.

Like a musical instrument, the exhaust can be tuned to a fundamental frequency. The high-power engine speed can be determined by the base specific fuel consumption characteristics. This high-power RPM can drive the design of the exhaust. For stationary operations, a lower idle can reduce fuel consumption and noise. This low idle can be selected musically, specifically two octaves below the high-RPM power setting. For example, a high-RPM power setting of 3900 RPM on a 90° cross-plane V-8 can result in a fundamental frequency of 260 Hz, which is close to the musical note C4. An idle of 975 RPM can represent the note of Ca. By tuning for a fundamental of Ca, the exhaust could effectively cancel both RPM points and their overtones.

In one aspect, the engine 325 can be a Banks Power 3.0 L V6 Diesel engine. The engine is much lighter than standard diesel engines (Power Stroke, Duramax, or Cummins) which can easily weigh over 1,000 pounds. The Banks Power 3.0 1 V6 engine can weigh about 535 pounds and when tuned to 4,400 RPM can produce 223 kW and just over 500 lbs-ft of torque.

Alternatively, the engine 325 can be a conventional GM LSx engine, which can meet the power requirements at low RPM by an LS3 with an ASA cam (available from GM Performance as the LS376/525).

Diesel fuel can be the energy source. The energy is ultimately expended through electromotive power generated by the hub motors 1005. As such, the vehicle 10 can comprise at least one of the electric generators 330 to convert the mechanical energy from the engine 325 to electrical energy to feed the batteries 335 and hub motors 1005. In one aspect, the generator 330 can be a permanent magnet machine or generator (PMG). A PMG uses magnets, usually neodymium, instead of an electromagnet. As such, there is no requirement to excite a magnetic field to generate power. A dead-start of the system can be possible. Additionally, the PMG can be able to start the diesel generator 330 nearly instantaneously without contributing to the vehicle's noise profile.

In order to simplify packaging and reduce part count, an output shaft of the engine can connect directly to an input shaft of the generator 330, eliminating the need for a gearbox or transmission. Additionally, hollow shaft generators exist and multiple generators can be stacked on the same splined output shaft, greatly increasing power output without increasing the RPM on the engine.

The batteries 335 of the vehicle 10 can be an integrated battery pack complete with battery management control electronics and water cooling connections. In one aspect, due to energy density, discharge curve profiles, and long-term durability, lithium polymer batteries can be preferred over a nickel metal hydride (NiMH) chemistry. Prismatic Lithium Iron Phosphate cells can represent the forefront of practical, off-the-shelf battery technology. The construction, reliability, packing efficiency, peak power capacity, and safety lend themselves well to vehicle platforms, such as the vehicle 10 depicted herein. Lithium Iron Phosphate is a non-volatile battery chemistry and is capable of taking gun fire without causing additional damage to surrounding equipment. A123 Systems offers a 23 kWh "Energy Core Pack". At 393V nominal, this battery pack can require a step-up in voltage to meet the 600V common bus 1010. Such a battery pack can be modular, easily replaced, and reliable.

In one aspect, the vehicle 10 comprises a front-generator layout with hub-motor-driven wheels. Significant design and packaging freedom exists, as there is no mechanical connection between the engine 325 and the driven wheels 116. Thus, the serial hybrid arrangement of the vehicle 10 can eliminate the need for gearboxes and transmissions. This eliminates many points of failure, frees up valuable internal volume, and allows for a more compact and smaller vehicle 10. Multiple hub motors 1005 can provide redundancy to the drivetrain 26, ensuring the crews ability to safely make it back home. The ability to run entirely on batteries 335 during on-station silent watches or scouting missions can significantly reduce the vehicle noise level. This reduced sound profile can provide a valuable layer of protection to the crew and allows them to be more effective on the battlefield.

As illustrated in FIGS. 11A-B, the vehicle 10 (shown in FIG. 1) can further comprise a suspension system 28 configured to endure high-speed operations on rough terrain. A compliant and effective suspension system 28 can improve weapon aiming capability, vehicle control, and overall crew effectiveness. By keeping the vehicle 10 appropriately suspended, vibration and motion can be reduced. Additionally, extreme loads can be put on the tracks 120, and controlling their movement can be critical. Trailing-arm type suspensions allow for precise planar kinematic control of a driven wheel 116 (shown in FIG. 1). Their strength and simplicity lends nicely to maintenance and inventory control.

The suspension system 28 can comprise a trailing arm linkage system, and each external trailing arm 305 can easily be accessed and serviced individually. Because the vehicle 10 relies on friction drive from the driven wheels 116 to move the track 120, the trailing arms 305 can also contain the necessary cooling lines and electrical conduits that connect the external driven wheel 116 to the internal cooling and electrical system of the vehicle 10. Therefore the structure of the trailing arms 305 can be a monocoque structure design with open internal passages. All the trailing arms 305 for the system can be designed as the same part number to simplify inventory and production. In the present aspect, at least one of the driven wheels 116 can be a driven road wheel 1110. In the present aspect of the suspension system 28, each the trailing arms 305 can define a first end 1106 and a second end 1107, wherein the first end 1106 can be connected to one of the corresponding driven wheels 116 and the second end 1107 can be connected to the hull 110 (shown in FIG. 1) through a rotating joint 1108.

The suspension system 28 can further comprise one or more rear idler wheels 117 (shown in FIG. 1) sprung and located on a trailing arm 305 to maintain track tension. The rear idler wheels 117 can apply no tractive or braking torque to the track 120. A spring mechanism (not shown) of the rear idler wheels 117 can allow travel with a set preload, and this preload can be set electronically by the vehicle control system. For track change, an idler retraction mechanism (not shown) can be integrated. Example aspects of the wheels 115, including the driven wheels 116 and idler wheels 117, can have no mechanical torque transmission connection to the hull.

In one aspect, the suspension system 28 can be a hydropneumatic suspension. Such a hydropneumatic suspension can require pressurized hydraulic accumulators 1115 for each trailing arm 305. In one aspect, a membrane 1120 can separate hydraulic fluid 1125 from a small amount of pressurized gas 1130, such as nitrogen. The pressurized gas 1130 can act as a spring, allowing compliance at each trailing arm 305. By pumping fluid 1125 in or out of the localized system, the ride height can be precisely controlled. A single master accumulator, dump tank, pump, and valve control system can control all trailing arms 305 from under armor 1605 (shown in FIG. 16). Such a system can isolate each trailing arm's hydraulic circuit in order to prevent a failure cascade.

This suspension layout allows the vehicle 10 to raise or lower itself at will. As seen in FIGS. 12A-D, the vehicle 10 can operate in a crouched position during silent-watch or stealth operations. In one aspect, the vehicle 10 can lower itself up to 20 inches, reducing its profile from all directions and allowing it to better hide among its surroundings. The vehicle 10 can be able to raise the rear of the vehicle 10 to get a better depression angle of a main gun 1205 when firing down from a high point, and also raise the front to better fire behind itself. The current configuration allows the change to change its elevation range by +/−8°.

The light weight of the vehicle 10 allows for effective use of active suspension systems 28 that can add to maneuverability and combat effectiveness. By coupling simple trailing arms 305 with a sophisticated hydropneumatic suspension, the vehicle 10 can control its altitude and attitude on the battlefield and during transport. A smoother ride can allow greater command authority from the crew and greater fighting effectiveness.

Figure 13A:
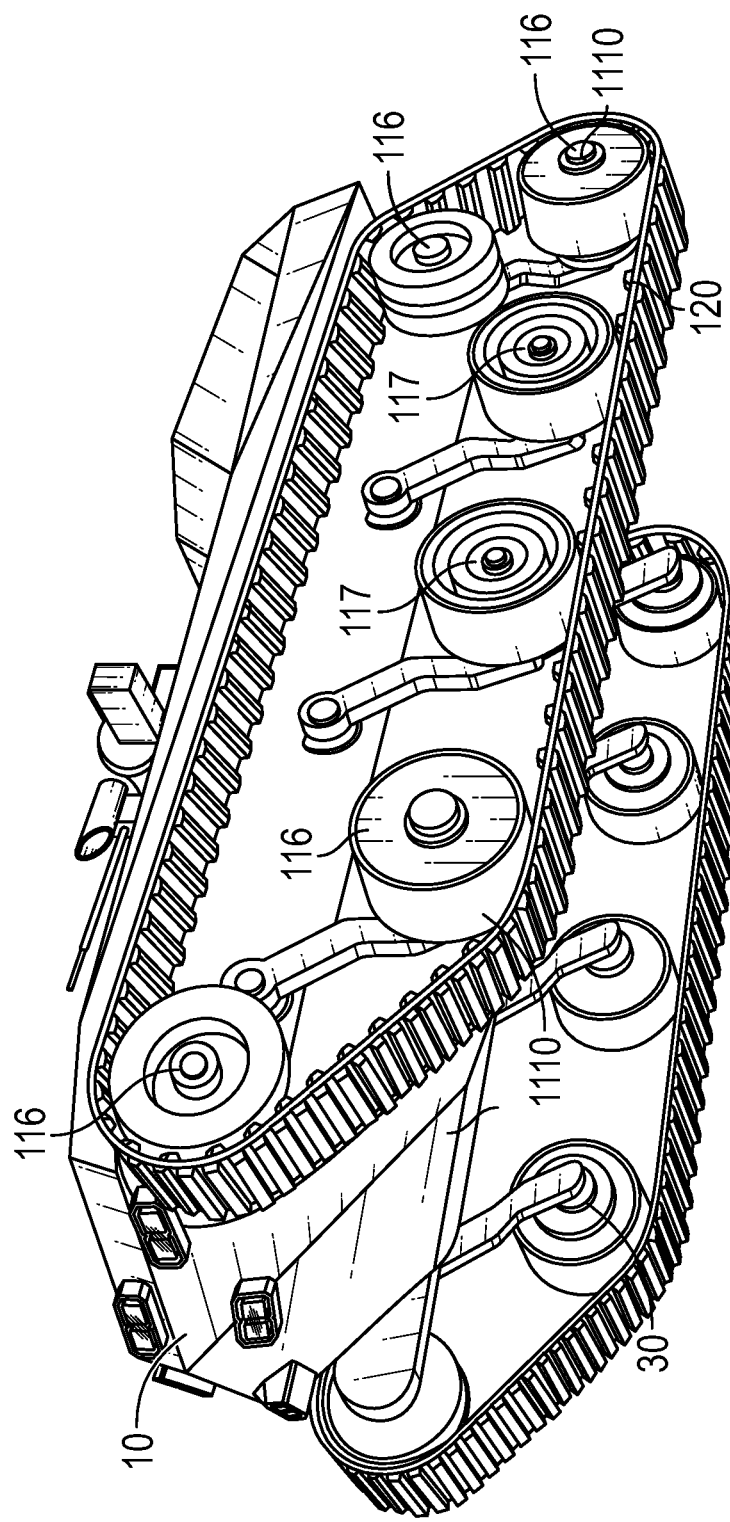
FIG. 13A is a perspective view of a four-motor motor arrangement of the support vehicle of FIG. 1A.
Figure 13B:
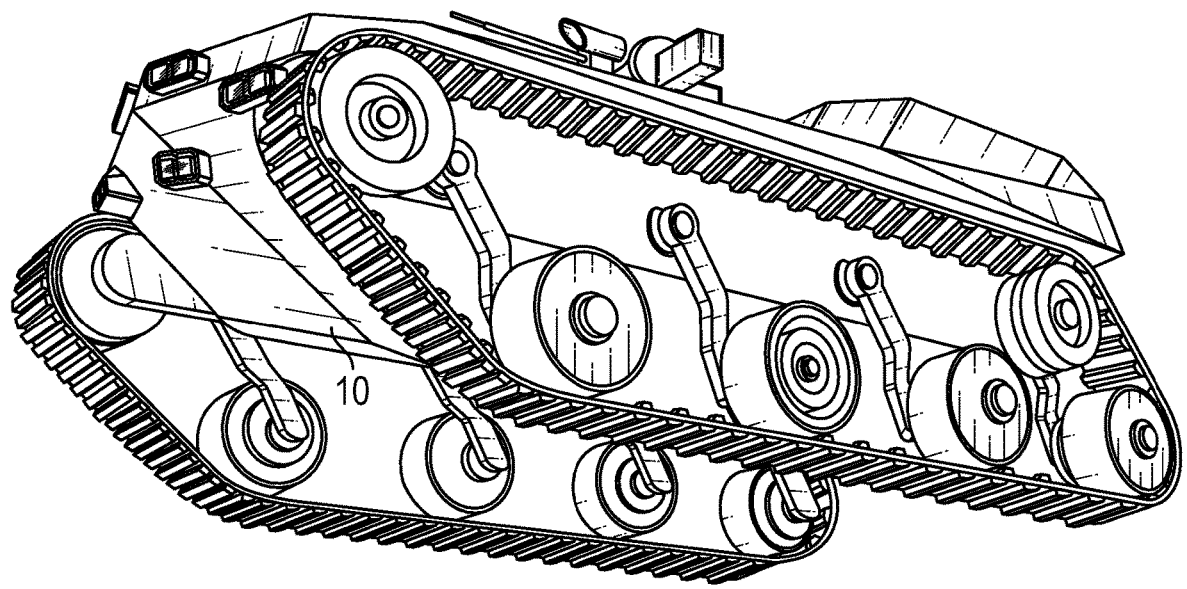
FIG. 13B is a perspective view of a six-motor motor arrangement of the support vehicle of FIG. 1A.
Figure 13C:
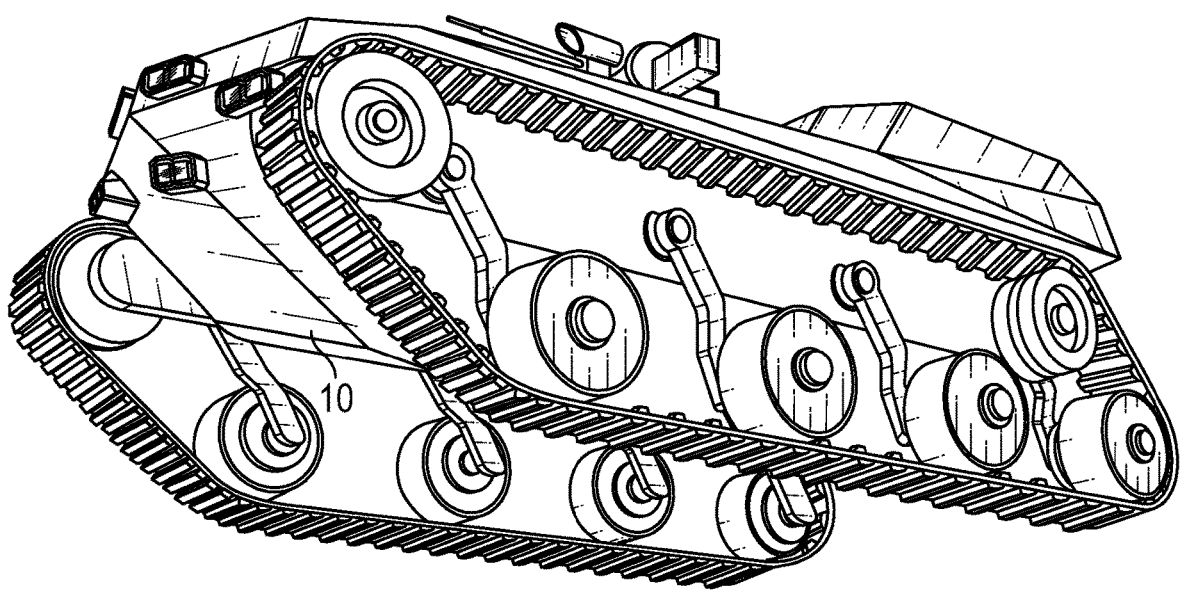
FIG. 13C is a perspective view of an eight-motor motor arrangement of the support vehicle of FIG. 1A.

As previously discussed, the vehicle 10 comprises wheels 115, some of which are driven wheels 116 with motors 1005 (shown in FIG. 10) mounted within the hubs of the driven wheels 116. This is an unconventional approach for a military-tracked vehicle. Also, as illustrated in FIGS. 13A-13C, the some of the driven wheels 116 can be driven road wheels 1110 that are mounted to act against portions of the track 120 in contact with the ground, rather than upper portions of the track 120 that are spaced from the ground as in conventional military-tracked vehicles. This configuration can provide better traction and responsiveness for the tracks 120, as well as the previously-discussed ability of the driven wheels 116 to propel the vehicle 10 without a track 120.

In a serial hybrid-electric drivetrain 26 (shown in FIG. 10), there is no mechanical connection between the hydrocarbon-burning engine 325 and the driven road wheels 1110. The engine 325 is directly connected to the electric generator 330, which supplies power to the common bus 1010. The common bus 1010 distributes electric power from the generator 330 to the batteries 335 and all other electrical loads. The most notable load can be the hub motors 1005 mounted within the driven road wheels 1110. By powering the driven road wheels 1110 with in-hub motors 1005, stress on the "composite band" track 120 can be reduced. This also allows the vehicle 10 to continue without a track 120 if necessary. Multiple motors 1005 also afford system level driveline redundancy, as damaged motors 1005 can be electrically disconnected from the system and allowed to freewheel with minimal capability loss. In this manner, the vehicle 10 can take serious damage, assess its capabilities with the crew remaining within the hull 110, complete its objectives, and return home.

In one aspect, there can be multiple potential hub motor layouts for the vehicle 10. The number of driven wheels 116, specifications for the hub motors 1005, and weight of vehicle 10 can all be balanced as the design of the platform matures. FIGS. 13A-C illustrate various layout configurations which designate the location and quantity of the motorized driven road wheels 1110. In the FIGS. 13A-C, hub-powered driven road wheels 1110 are shown in lighter grey and standard idler wheels 117 are shown in darker grey.

In one aspect, the vehicle 10 can comprise four hub motors 1005. More hub motors 1005 can be added to meet performance goals that cannot be reached with just four motors 1005. Optionally, a high-performance or heavy variant of the vehicle 10 could make use of a modular swing arm-motor configuration. If the four-motor variant is chosen, unpopulated space for two additional motor controllers can be provided in order to support this future modularity.

Figure 14A:
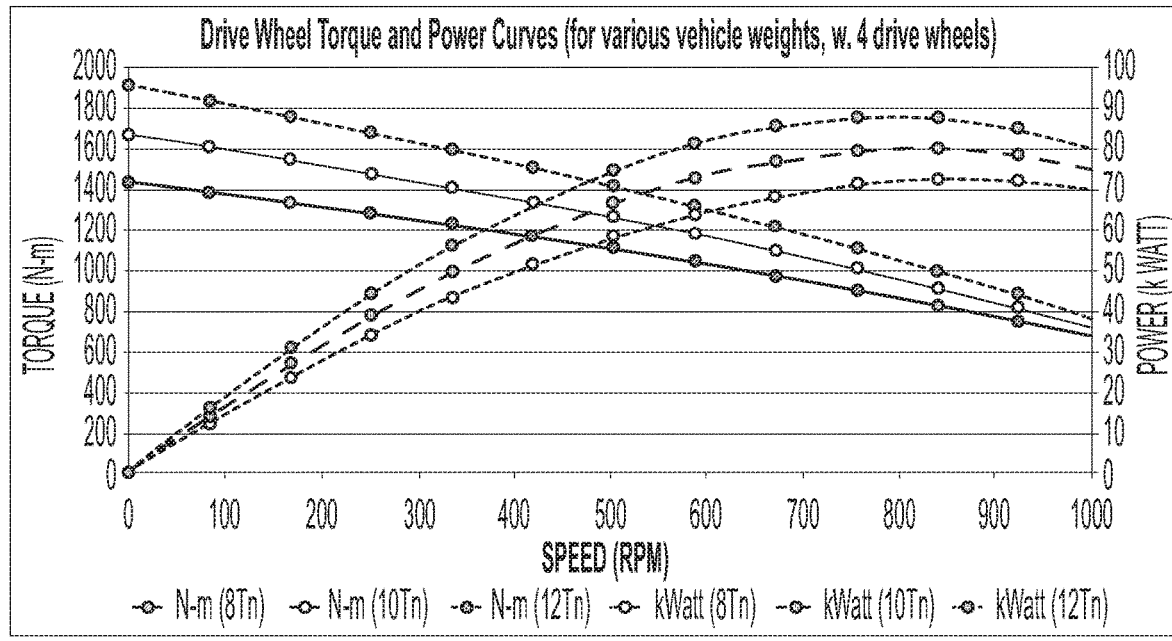
FIGS. 14A-14B are graphs illustrating torque and power curves as a function of RPM of the support vehicle of FIG. 1A.
Figure 14B:
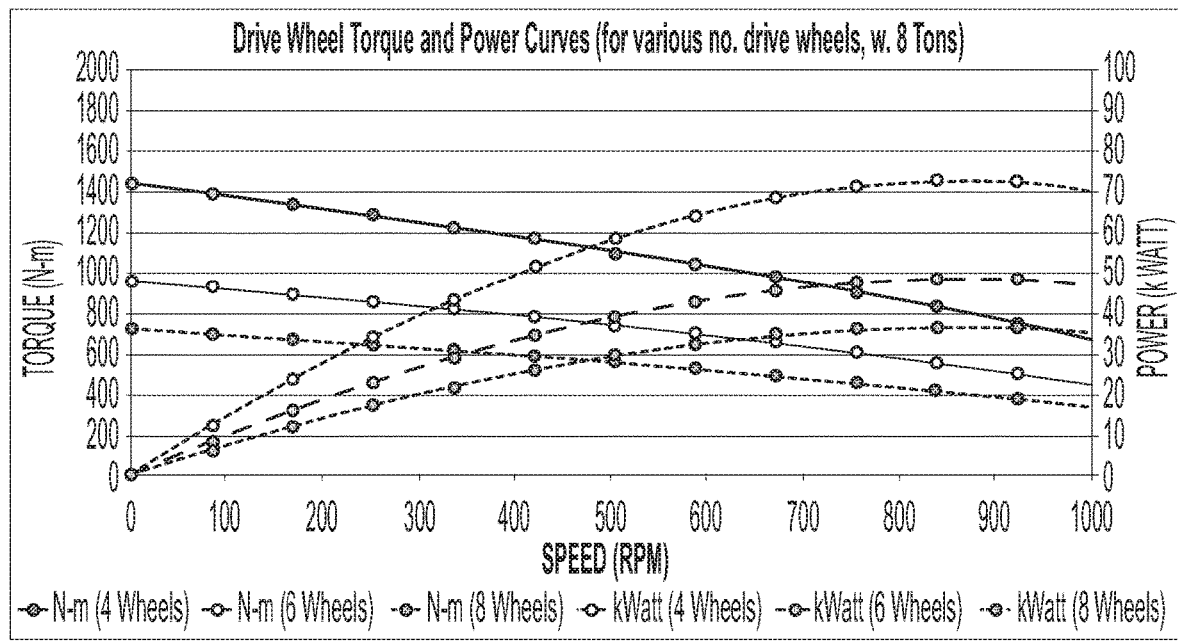

In one aspect, the motors 1005 can be water-cooled outrunner switched reluctance motors. These motors 1005 have no contacts or commutator, can be made completely waterproof, offer high torque with no gear reduction, and are resistant to internal damage. To meet the vehicle maneuverability, speed, and hill climb targets, in-depth analysis was performed for various vehicle configurations. FIG. 14A shows the Torque and Power Curves as a function of RPM needed in a 4 hub motor configuration. The various curves show target weights of 8, 10, and finally 12 tons. FIG. 14B shows the Torque and Power Curves as a function of RPM needed for an 8 ton vehicle 10. The curves show 4, 6, and finally 8 driven wheels 116 (shown in FIG. 13).

The construction of the outrunner switched reluctance motors 1005 requires no rare-earth metals. The motor's requirements can be set by the final selection of the number of driven wheels 116 needed and the final weight of vehicle section. The electrical design of a rotor, a stator, and windings (e.g., copper windings) of the motors 1005 can be selected to meet those requirements. A bus voltage of 600V is set as the target to reduce the gauge of the windings in order to minimize the motor weight. In concert with the electrical design, the mechanics of the motor 1005 can be analyzed. Housing size, bearings, and braking system can be specified. A rigid mounting method of the motor 1005 to the trailing arm 305 can be selected as well as the addition of ruggedized cooling lines and electrical lines going into and out of each motor 1005.

The weight of the motors 1005 can change the design requirements of the suspension, because of the higher than usual un-sprung mass associated with the motors 1005. The package of the hub motor 1005 can stay within a 16 inch diameter and 15 inches in depth (including brake and mounting accoutrements). Each motor 1005 can further comprise complex control electronics and inverter assemblies to control each motor 1005.

Application of the drivetrain 26 and motor architecture to the vehicle 10 can greatly aid the modern soldier. The advantage of packaging multiple high power electric motors 1005 in the driven wheels 116 affords unique abilities for the vehicle 10, specifically continued operations in the situation of a thrown track and/or a destroyed hub motor 1005. Redundancy of the drivetrain motors 1005 can be a unique feature set in a military vehicle 10 of this size, bringing enhanced survivability and effectiveness to the battle space.

The tracks of the vehicle 10 can be formed from steel, aluminum, and/or composite band tracks. Steel tracks add to overall vehicle survivability and force protection, but steel tracks can be heavy and loud. Lightweight aluminum can serve as an alternative metal track to steel, but aluminum can also add a significant amount of weight and noise to the vehicle 10. A composite band track, such as a rubber composite band track manufactured by Soucy, can weigh about 50% less, can reduce the amount of track noise by about 70% (noise, vibration, and harshness), and can use about 40% less fuel than a comparable steel track.

One downside of a composite band track can be reduced ability to repair in the field or short-track the vehicle 10. This is at least partially overcome by the ability of the vehicle 10 to drive without the track 120. A splice kit for the track 120 is available, however. Another downside of a composite band track is that composite band track wears faster than steel track. Rocks between the drive road wheels 1110 and the track 120 can be a problem. Range for the track 120 can be anticipated to be in the 3000 mile range. The failure mode in track wear is anticipated to be wear on the tread blocks and outside of the track.

In one aspect, the track tension using a friction drive can be about 20%. Typical targets for a sprocket-drive track hover around about 15%. Tension can be positively correlated with longevity, that is to say, higher tensions can lead to increased range and reduced wear. It was speculated that the tension maintains the ground pressure between driven road wheels 1110.

Changing a track 120 on the vehicle 10 of the present application can be much simpler than changing a track on conventional vehicles. With an automatic idler retraction mechanism (not shown), the track tension can be removed without human effort. The hydropneumatic suspension system 28 can be used as a jacking system. To be used, the vehicle 10 can be lifted to its highest ride height and blocks can be placed under the hull 110. The suspension system 28 can then be set for the vehicle's lowest ride height. Nitrogen gas cylinders can be isolated through a shutoff valve, and a central hydraulic pump can pressurize the "rebound" side of the shocks, lifting the driven road wheels 1110 off the ground. As the driven road wheels 1110 are lifted, the sprung idler wheels 117 can be locked into place, allowing the track 120 to hang slack. Changing the track 120 can then be straightforward.

In one aspect, a narrower track 120 having a width of 200 mm can be used. This track 120 weighs approximately 9.8 pounds/foot and is 25 feet long. This narrower track 120 however can reduce torsional rigidity and lateral bending stiffness. The width and stiffness of the track 120 can be a large contributor to de-tracking resistance The weapons module 14 of the vehicle 10 can be configured to be able to adapt to a combat situation. In combination with weapons module 14, the crew compartment 104 can be modular. This can allow the vehicle 10 to accommodate more complex weapons systems like a mortar system.

Figure 15A:
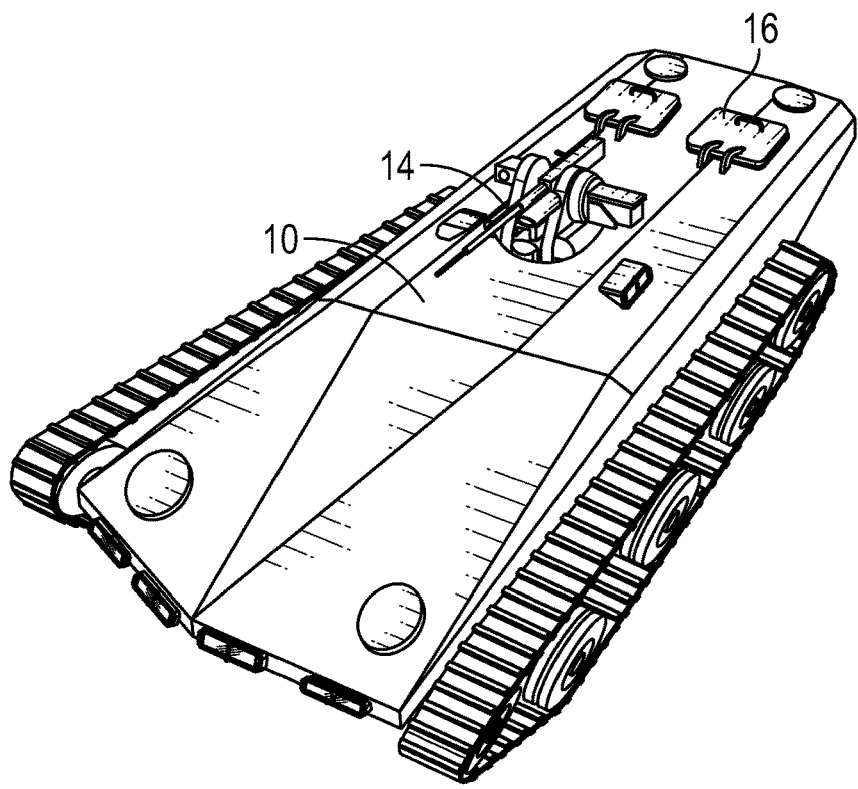
FIGS. 15A-15C are perspective views of weapons modules of the support vehicle of FIG. 1A.
Figure 15B:
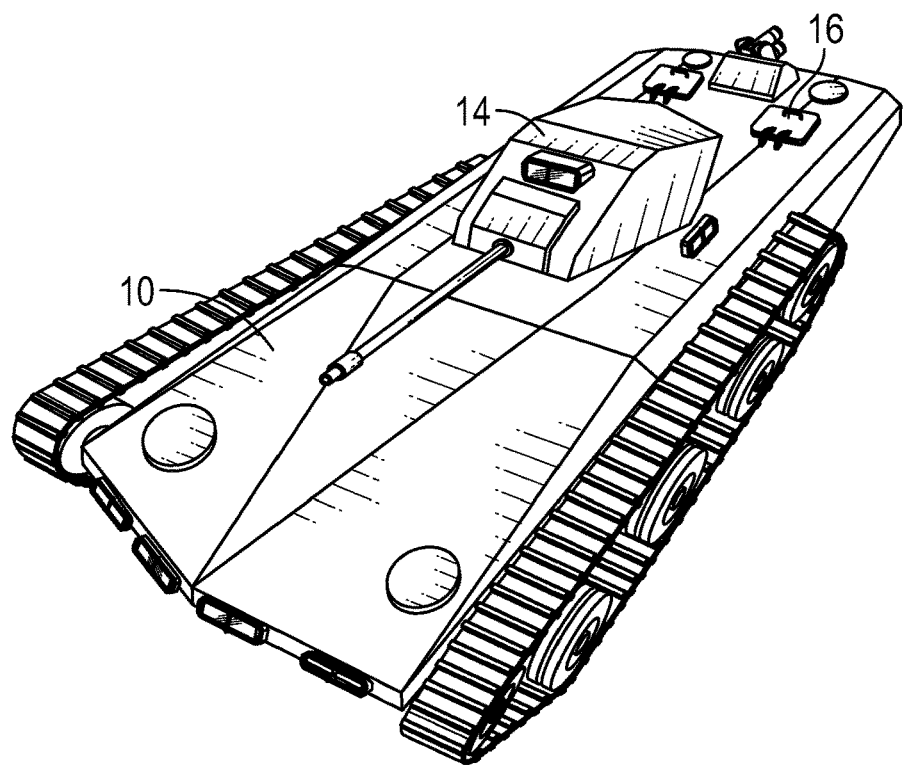
Figure 15C:
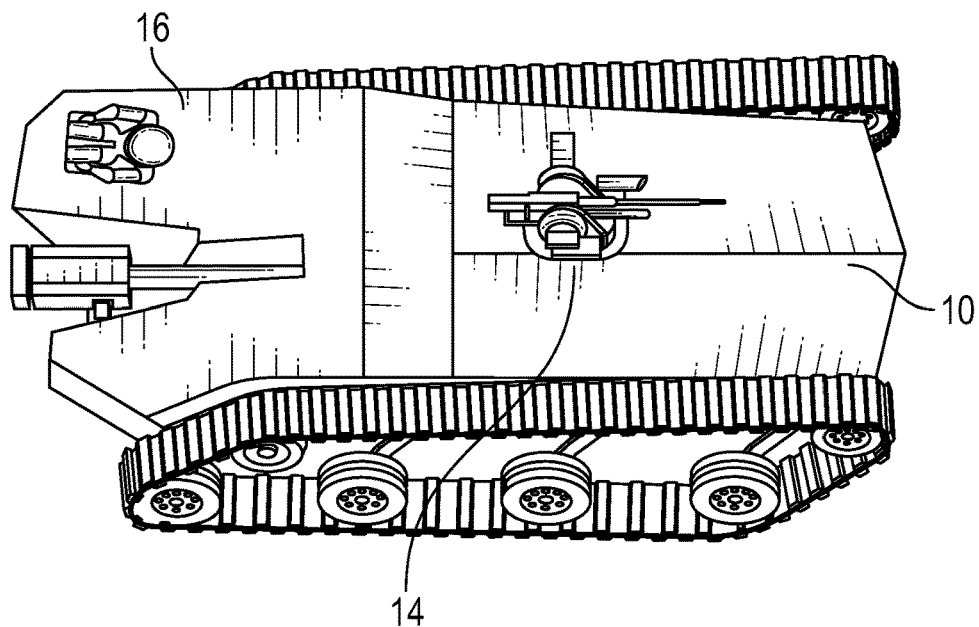
Figure 15D:
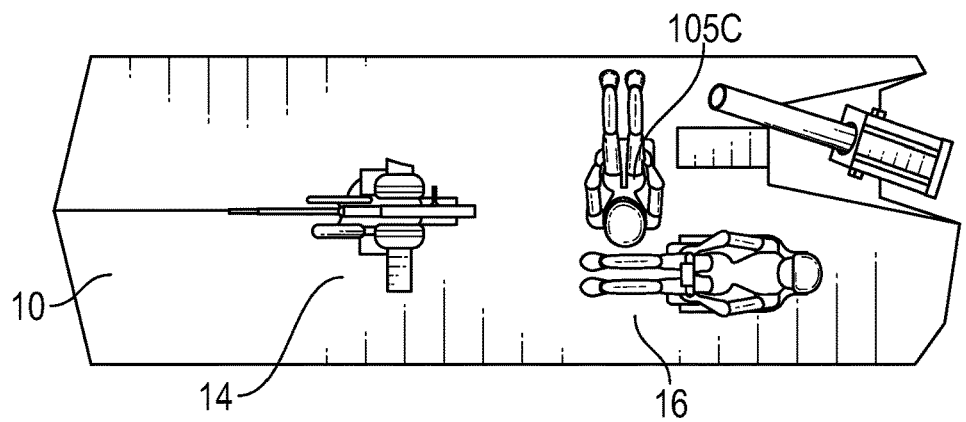
FIG. 15D is a cutaway top view of the weapons module of FIG. 15C showing the position of the crew members.

In one aspect and as shown in FIG. 15A, the weapons module 14 can comprise a .50 BMG Remote Weapons System. The .50 BMG Remote Weapons System can be positioned in the weapons module 14 with the standard crew module 16 adjacent the weapons module 14. In another aspect, and as illustrated in FIG. 15B, the weapons module 14 can comprise a 30 mm Autocannon that can be controlled remotely and is autoloading. The 30 mm Autocannon can be positioned in the weapons module 14 with the standard crew module 16 adjacent the weapons module 14. In another aspect and as illustrated in FIG. 15C, the weapons module 14 can comprise a mortar and .50 BMG remote weapon station. The mortar system can require a different crew module 16 as illustrated in FIG. 15D. In this aspect, the mortar system can be located in the rear of the vehicle 10 with a third crew member 105c directly in front to facilitate loading. The .50 caliber remote weapon system can be used for basic defense.

In one aspect, the crew module 16 can stop a 14.5 mm round from penetrating the wall of the crew module 16. To reduce overall weight, the protective hull 110 of the vehicle 10 can be wrapped around the crew module 16. Outside of the crew module 16, the vehicle 10 can be able to withstand multiple 7.62 mm AP rounds without a mobility kill.

Figures 16A, 16B:
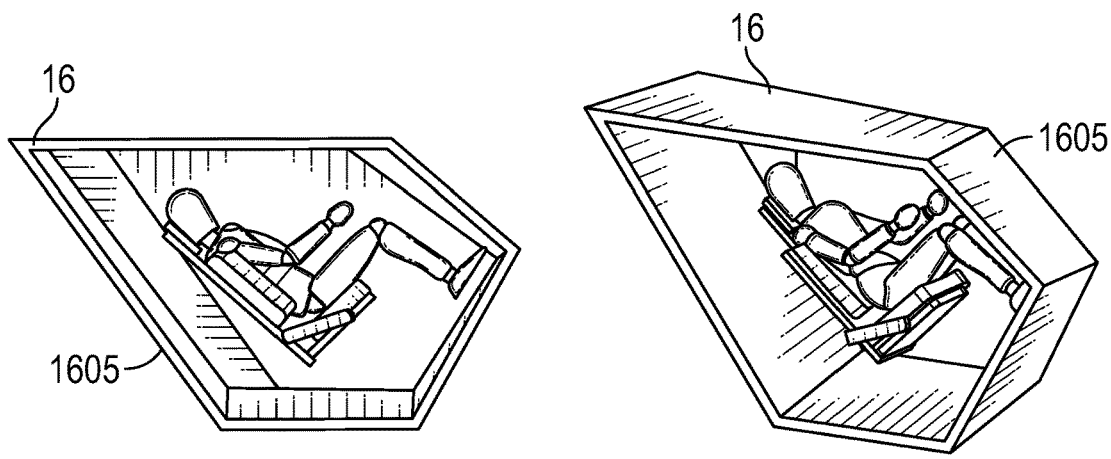
FIG. 16A is a cutaway side elevational view showing armor of the crew module of the support vehicle of FIG. 1A.
FIG. 16B is a cutaway perspective view showing armor of the crew module of the support vehicle of FIG. 1A.

Referring now to FIGS. 16A-B, in another aspect, the vehicle 10 can further comprise at least three inches of armor 1605 on all sides of the crew module 16 for a composite armor solution, including spall liners. Optionally, the armor 1605 can comprise at least four inches, at least five inches, at least six inches, or more than six inches of armor 1605 on all sides of the crew module 16. The armor 1605 for the vehicle 10 can further comprise armor 1605 configured to stop 7.62 mm rounds covering the engine 325, and hub motors 1005. The mass of the power generating unit can be forward of the crew, affording additional "second chance" armor 1605, especially in the situation of directed explosives and penetrators. Active protection systems can be a part of the armor 1605 of the vehicle 10, but slats, nets, and chains can be used as passive, lightweight shaped charge protection. The vehicle 10 can be STANAG compliant for a vehicle 10 of its size.

In one aspect, the crew module 16 can have protection from 14.5 mm rounds for about 60% of a front profile of the crew module 16. A side of the crew module 16 can also have provisions for 14.5 mm but for about 30% of the side profile. A rear of the crew module 16 can only need provisions for 7.62 mm AP rounds. A top of the crew module 16 can need to stop 155 mm shrapnel. The hull 110 (shown in FIG. 1) of the vehicle 10 (shown in FIG. 1) can stop a 1× blast event.

Because reducing weight improves the mobility of the vehicle 10, the armor 1605 of the vehicle 10 can be modular armor. In one aspect, the design densities for each armor protection requirement can be as follows in Table 1:

TABLE 1

| Armor Requirement | Traditional Armor | | Partner Armor - Weight Targets |
|---|---|---|---|
| 14.5 mm Round | 1.5" AR500 Plate | 62 lb/ft² | 28 lb/ft² |
| 7.62 AP Round | ⅜" AR500 Plate | 15 lb/ft² | 12 lb/ft² |
| 155 mm Shrapnel | 2¼" 5083 Aluminum | 32 lb/ft² | 25 lb/ft² |
| 1X Blast Event | 2" 5083 Aluminum | 28 lb/ft² | 25 lb/ft² |

In another aspect, the crew module 16 weight by protection requirement can be as follows in Table 2:

TABLE 2

| Armor Requirement | Density Range | Surface Area | Weight Range |
|---|---|---|---|
| 14.5 mm Round | 28-62 lb/ft² | 76.4 ft² | 2140-4740 lbs |
| 7.62 AP Round | 12-15 lb/ft² | 31.8 ft² | 380-480 lbs |
| 155 mm Shrapnel | 25-32 lb/ft² | 33.6 ft² | 840-1080 lbs |
| 1X Blast Event | 25-28 lb/ft² | 18.6 ft² | 470-520 lbs |
| Crew Module Total | | | 3800-6800 lbs |

The volume definition of the crew module 16 of the vehicle 10 is known. The single largest variable can be the armor density for 14.5 mm protection. The armor 1605 for the vehicle 10 can contribute towards crew armor, so some redundancy can be reduced.

Survivability of the lightly-armored vehicle 10 can be accomplished through active systems and redundancy. By powering multiple driven wheels 116 on each track 120 through hub motors 1005, the vehicle 10 can be able to limp home through various failure modes, including multiple thrown tracks 120 and motor hits. Mobility kills are acceptable on this vehicle 10 with hits exceeding 7.62 AP. In a large blast event, the vehicle's objective becomes focused on protecting the crew and allowing their recovery. A strong crew module 16 can form a survival cell linked to the mass of the hull 110 of the vehicle 10 and any active blast mitigation hardware installed.

Figure 17A:
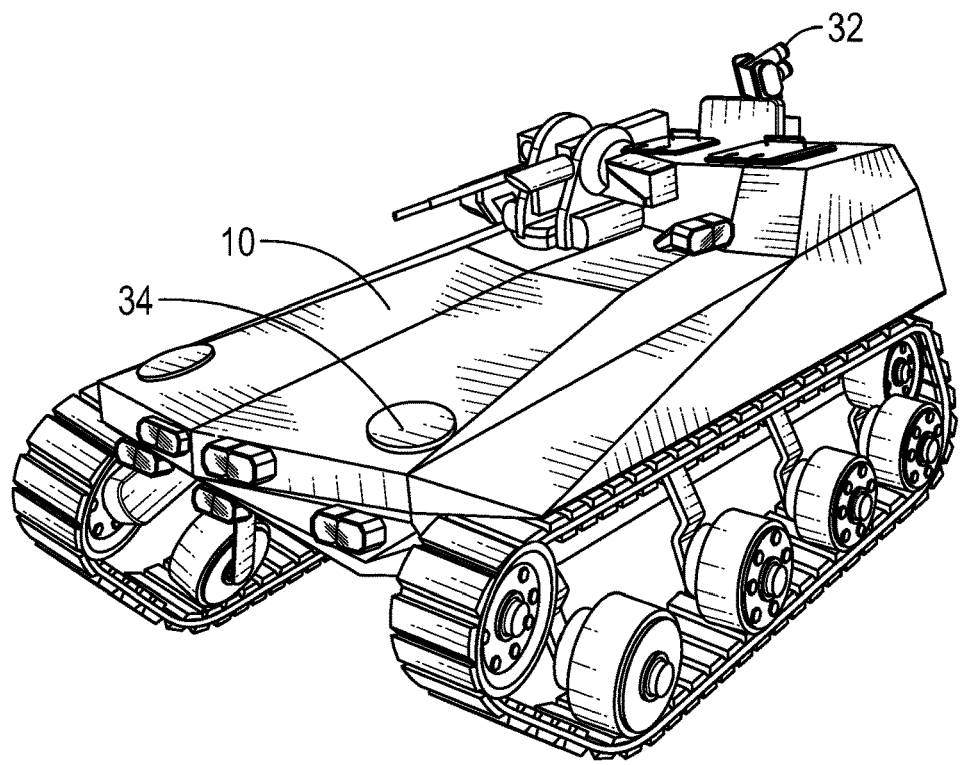
FIGS. 17A-17B are perspective views of an active protection system and an active blast countermeasure system of the support vehicle of FIG. 1A.
Figure 17B:
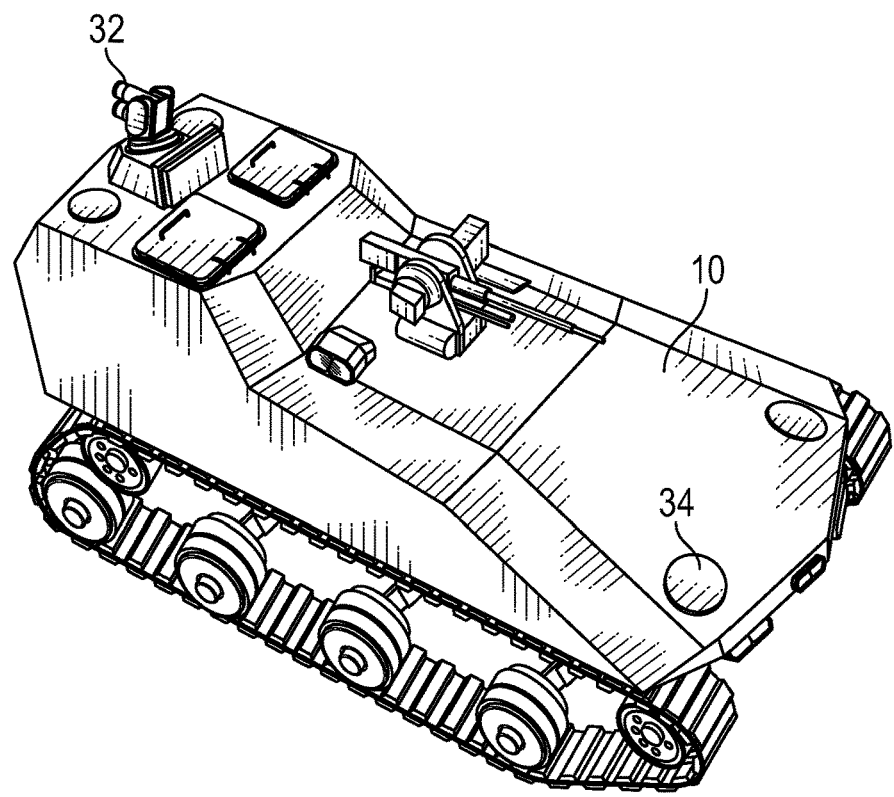

With reference to FIGS. 17A-B, the vehicle 10 can further comprise an active protection system 32 and an active blast countermeasure system 34. In one aspect, the active protection system 32 can fire an explosive round at incoming threats to detonate an explosive payload at a distance from the vehicle 10. In another aspect the active blast countermeasure system 34 can oppose the forces found in an improvised explosive device, reducing the overall accelerations seen by the crew. By keeping the crew on the ground, injuries can be reduced and the crew can be recovered. The vehicle 10 can be the first vehicle with an active blast countermeasure system 34 embedded into the vehicle design as opposed to an external addition. In another aspect, the vehicle 10 can further comprise integrated reactive armor panels in key areas (not shown), to provide additional last-chance protection to the crew.

As previously discussed, the hybrid drivetrain 26 (shown in FIG. 10) relies on powering a common DC bus 1010, which can be done by any combination of engine-generator output and battery power flow. An engine kill via a kinetic round through the engine bay 320 would not necessarily effect an immediate mobility kill, as the modular battery pack comprising the batteries 335 can provide the energy to effect a retreat. Due to the modular nature of multiple battery cells, direct battery kills would not necessarily effect an immediate mobility kill, but would only serve to reduce range, provided that the battery chemistry can be neutralized and a fire suppression system can keep the batteries 335 safe. As long as at least one battery bank or engine 325 continues to operate, the common DC bus 1010 can remain powered.

Each driven wheel 116 can have its only closed-loop of water cooling and connection to the common DC bus 1010. Total destruction of a driven wheel 116 could be addressed by decoupling the driven wheel 116 electrically and a loss of coolant could be localized to the damaged wheel 116. As long as the common DC bus 1010 remains energized, each driven wheel 116 can have enough torque to propel the entire vehicle 10 on level ground. As the driven wheels 116 are powered rather than drive sprockets, throwing a track 120 simply means less available traction. Hard surfaces or careful driving on loose surfaces could allow continued mobility, even with two destroyed tracks 120. With the addition of a kingpin axis (not shown) and hydraulic steering on lead driven road wheels 1110 of the road wheels 116, it is conceivable that the vehicle 10 could return home on a single hub motor 1005. With the hydro-pneumatic suspension system 28, a mechanically damaged driven road wheel 1110 could be lifted/elevated and its drag force on the vehicle 10 could be reduced.

After the vehicle 10 is recovered to a forward-operating base, repairs can be quickly and effectively performed due to the modular nature of the vehicle 10. Entire trailing-arm/wheel assemblies could be bolted back into place through clever design of weak points that protect the hull 110. In example aspects, the engine 325 and generator 330 can be located within a subframe removably mounted to the hull 110, allowing a quick swap. The battery banks/batteries 335 can also be positioned for quick access and replacement.

By integrating nuclear, biological, and chemical protection into the hull of the vehicle 10, a survival cell can be formed to resist enemy arms, fire, and other external dangers. This protection can still be effective with a destroyed vehicle 10 around it, as long as power and life support systems are maintained. Hard connection points can be placed around the crew module 16, and its connections to the rest of the vehicle 10 can be designed to break away in a recovery option.

The hybrid-electric drivetrain 26 brings strengths and improved resilience to the platform. By eliminating chains with single-points of failure (engine/transmission/driveline/sprocket/track), the vehicle 10 can be fundamentally more reliable. Through careful system design, modularity, and redundant failure modes, the vehicle 10 can be a resilient vehicle 10.

Figure 18A:
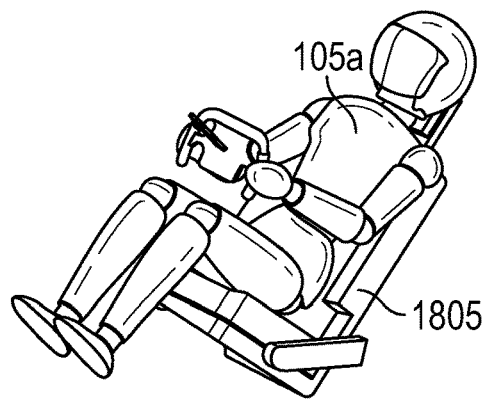
FIG. 18A is a perspective view of a seating position of a crew member of the support vehicle of FIG. 1A.
Figure 18B:
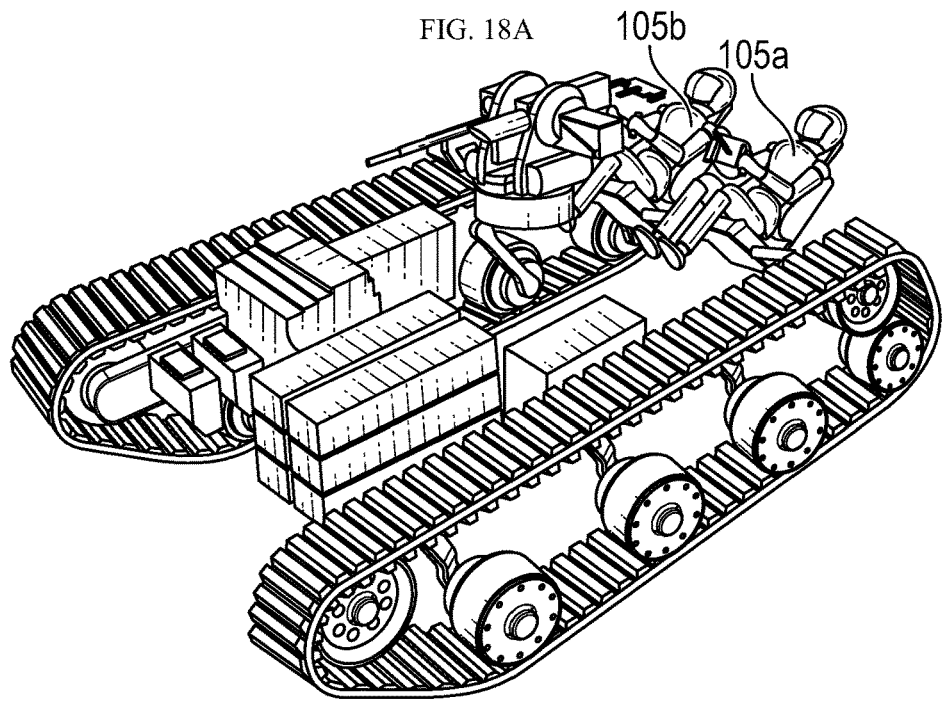
FIG. 18B is a schematic perspective view showing the seating position of the crew members of the support vehicle of FIG. 1A.
Figure 18C:
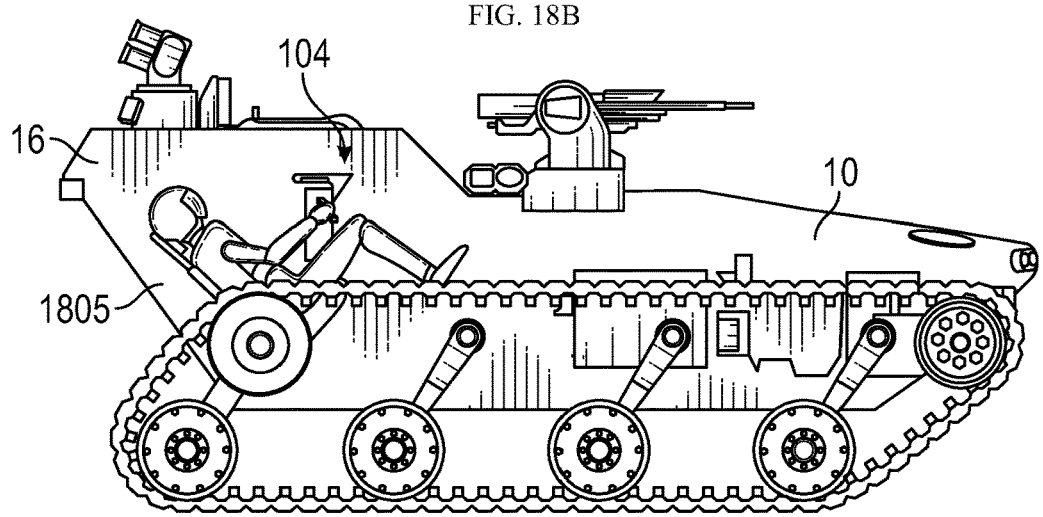
FIG. 18C is a cutaway side elevational view showing the seating position of the crew members of the support vehicle of FIG. 1A.

With reference to FIGS. 18A-C, the crew module 16 of the vehicle 10 can achieve a balance between safety, size, operational agility, and accessibility. The shape and surrounding structure of the crew module 16 can deflect incoming fire and blasts. Blast-mitigating seats 1805 can absorb the vast accelerations seen in an IED event. Each seat position can have at least one clear egress path that can be navigated in an emergency. The seats 1805 can be designed to mitigate blasts through a controlled stroke action. To increase force protection, the seats 1805 can be leaned back 45 degrees. The angle of the seats 1805 can decrease stress on the spine of the crew members if there is an explosion under the vehicle 10. As an additional benefit, the reclined position reduces the height of the vehicle 10, decreasing mass and target profile size.

The roles of the two crewmembers 105*a,b* can be driver and gunner. The duties of the crewmembers 105*a,b* can be accommodated within the space of the crew module 16. Due to the size of the vehicle 10, occupying the turret is not practical. All crew can remain within the hull of the vehicle 10. Conventional vehicles have placed the driver in the front for visibility, but due to advances in imaging and data processing, there is no need to place the driver in the front of the vehicle 10. Instead, both driver and gunner can have full situational awareness through helmet mounted displays and speakers. A backup periscope or optics port for the driver and gunner can be provided.

The crew compartment 104 can comprise a symmetric two man crew. In one aspect, there can be two seats 1805 with identical controls. This can allow each crew member 105*a,b* to take over the job of the other crew member 105*a,b* if needed. Referring now to FIGS. 19A-B, in another aspect, the vehicle 10 (shown in FIG. 1) can comprise a vehicle controller 36. Referring to FIG. 19A, when disconnected from the vehicle 10 (shown in FIG. 1), the controller 36 can be controlled by one of multiple thumbsticks on the controller 36 itself. Referring to FIG. 19B, in other aspects, the controller 36 that can be mounted on quick-release bearings 1905 of the vehicle 10 and can turn as a steering wheel (not shown). When disconnected, for example, vehicle yaw can be controlled by one of multiple thumbsticks on the controller itself.

In another aspect, the vehicle controller 36 can be wireless and allow a crew member to control the vehicle 10 from outside the vehicle 10. Within the vehicle 10, both crew members 105*a,b* can be equipped with an augmented reality helmet 1910, which can allow them to intuitively see the battlefield through the hull of the vehicle 10. The crew does not need to rely on small periscopes or holes in the vehicle 10 for situational awareness. Instead, the crew of the vehicle 10 operates within the vehicle 10 with the hatches 150 closed. To maintain situational awareness, the vehicle 10 can be surrounded by an array of sensors for visual and audio inputs. To make use of that data, sophisticated computational equipment can be required. Displaying that data effectively can require vehicle-mounted displays. With the emerging augmented-reality head-mounted displays, the crew can receive through-the-hull information to support situational awareness, targeting, and vehicle maneuvering.

By utilizing standardized control layouts and displays, the vehicle 10 can support drive and gunner roles in either seat. In other military vehicles, the gunner and driver have very different controls. This means that if the gunner needs to take over the operation of the driver, he would not be able to operate the vehicle 10. Each crew member can have a Multi-Function Vehicle and Fire controller capable of driving the vehicle 10 and aiming the weapons systems simultaneously. With this solution, the crew members 105*a,b* can be able to remove the controller 36 from the vehicle 10 and operate their controls from a short distance. When attached to the vehicle 10, the controller 36 can spin like a normal steering wheel to control steering function. When disconnected, steering can be controlled with a thumbstick. Controller mounts for mounting the controllers 36 to the vehicle 10 can fold away for egress and ingress. In some aspects, a mount base of each controller mount can be located on the ceiling.

This can allow the crew to be external to the vehicle 10, but still be able to drive for investigating high risk locations, driving thru dangerous choke points while still keeping the crew safe, and the like. In an emergency, the vehicle 10 could be purposely sacrificed and used to clear mines. All electronics and data links from the operator to the vehicle 10 can be ruggedized against electronic warfare threats.

The Multi-Function Vehicle and Fire controller can utilize a common CANBUS communication so that the systems can easily be integrated with a minimal number of connections.

As previously discussed, the vehicle 10 is a non-traditional vehicle that aims to keep the crew safely within the vehicle 10 at all times. The vehicle 10 can be surrounded by an array of sensors for visual and audio inputs. To make use of that data, sophisticated computational equipment can be required. Displaying that data effectively can require vehicle-mounted displays. With the emerging augmented-reality head-mounted displays, situational awareness, targeting, and vehicle maneuvering can be done by instinct with through-the-hull awareness. In one aspect, the through-the-hull visualization can match 1:1 with the outside world. By utilizing a standardized control layout and display system, the vehicle 10 can support each role in any of the seats 1805.

Historically, most conventional tanks place the crew in an upright position except for the driver, who is seated in a reclined position. Research has indicated that a reclined position is more survivable in a blast event, so there are benefits to extending the driver's position to the rest of the crew. Such a position allows the hull 1010 to be shorter, reducing the profile of the vehicle 10.

Each crew position can comprise a fold-away digital instrument touch panel that shows status information about the vehicle 10. This can provide navigational data, speed, driveline status, inclinometer data, etc. Another screen can show a top-down view of the battlefield with Friend-or-Foe markers and relevant data points from the external sensor array and battle-net. Each position can be supplemented by backup periscopes and optics. A situational-awareness Helmet Mounted Display System incorporates an augmented reality display that can allow the crew members 105*a,b* to see through the hull of the vehicle 10. The helmets 1910 can display night vision with zoom capability directly to the crew members 105*a,b*. This can allow for full 360 degree vision of the battlefield without the danger of looking out of the hatches 150 of the vehicle 10, and windows can thus be eliminated, increasing the safety for crew members 105a,b inside the vehicle 10. This helmet 1910 can handle all threat assessment and targeting.

In one aspect, the vehicle 10 can further comprise an external sound awareness system built into the vehicle 10. This system can use a distributed network of microphones and a sophisticated model of the vehicle's noise profile to reduce the apparent volume of the vehicle 10 to the crew and amplify outside noises. This sophisticated noise-cancelling system can enable the crew to hold conversations with team members and personnel walking alongside the vehicle 10.

The above-described situational-awareness system also allows for training exercises within the vehicle 10 itself, rather than a separate training simulator. The crew-member-in-training can sit in the vehicle 10 itself with the Helmet Mounted Display System activated and the situational-awareness system in a training mode, allowing the crew members 105a,b to work the controls of the vehicle 10 without moving the vehicle 10 and to receive virtual training exercises loaded into the vehicle's systems.

In another aspect, the base electrical loads can be defined as below in Table 3. In this aspect, design heat rejection loads can be about 50% of the power requirements.

TABLE 3

Summary of Non-Driveline Power Requirements

| (all units kW) | Silent Watch | Travelling | Active Combat |
|---|---|---|---|
| Situational Awareness | 2.0 | 2.0 | 2.0 |
| Climate Control & NBC | 15.0 | 17.0 | 20.0 |
| Vehicle Controls | 0.5 | 0.8 | 0.8 |
| Weapons Control/Targeting | 0.5 | 1.5 | 10.0 |
| Communications | 5.0 | 5.0 | 5.0 |
| Total | 23.0 | 26.3 | 37.8 |

In a further aspect, the vehicle 10 can comprise at least one box (not shown) at the rear of the crew module 16 configured to house the computers and control systems. For example and without limitation, the rear boxes can be about 20 inches wide, about 26 inches tall, and about 5 inches deep. For comparison, this size is able to accommodate a conventional 4U server rack. The size of the rear boxes can grow or shrink depending on the project requirements. The rear boxes can be covered by removable panels.

There can be additional power conditioning equipment located within the engine bay 320, and a vented bank of batteries 335 can be positioned behind the engine 325 at the front of the crew compartment 104. There can also be a lithium ion battery positioned in the hull 110 for the drivetrain 26. All electricity for the vehicle 10 can be provided by the main generator 330. The generator 330 can provide power to the common DC bus 1010 at a nominal 600V. All power for auxiliary electric equipment can be provided through an appropriate system of inverters and rectifiers. In one aspect, the inverters and rectifiers can be located on the common bus 1010, near the high-voltage battery bank. In another aspect, a small 12V bank of deep-cycle lead-acid batteries can be located behind the engine 325. Normally, the vehicle 10 can be started using the high-voltage bank and generator(s) 330, but the low-voltage bank can exist as a backup starting system using a conventional starter. This bank can also act as a short-term buffer to absorb peak low-voltage electrical loads and stabilize low-voltage sensor readings.

In one aspect, the vehicle 10 can further comprise a dedicated low-temperature liquid cooling loop run for the electronics. The control electronics at the rear can get the coolest flow, followed by the power inverters, then the battery banks. The main computer systems at the rear of the crew compartment 104 can be vented to the crew compartment 104 with intakes at the bottom and extraction fans at the top. A modular manifold can be provided at the bottom of each box for water cooling. This cooling system can be separate from the motor cooling loop(s).

Separate data, power, and cooling conduit can be run under the floor from the battery bank to the rear computer panels. From this rear bulkhead, each crew position can have separate data and power conduit line for controls, displays, etc. The weapons module 14 can be supplied with capped off power terminals, water cooling loops, and if required, hydraulic pressure loops. Any high-voltage lines can require dedicated conduit and special consideration.

Figure 20A:
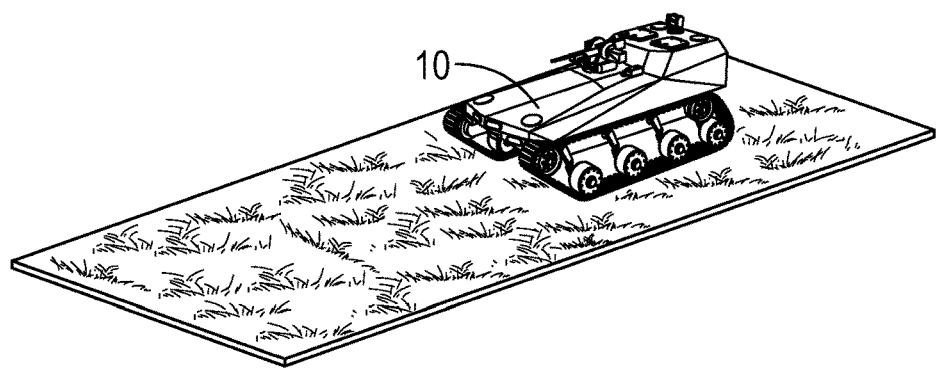
FIGS. 20A-20E illustrate a sequence of events wherein the support vehicle of FIG. 1A makes contact with an improvised explosive device (IED).
Figure 20B:
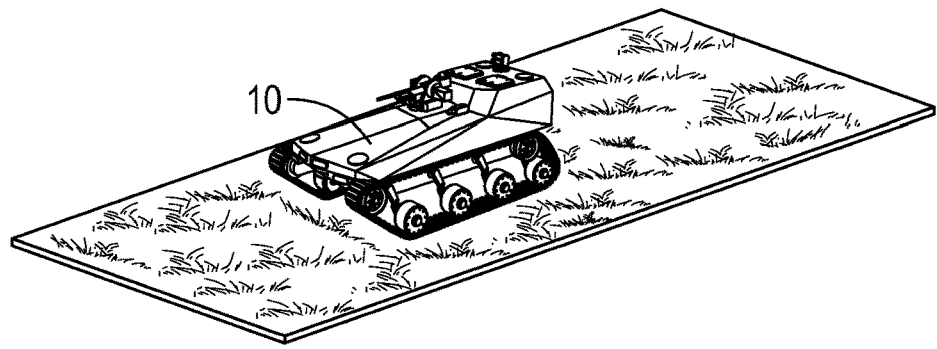
Figure 20C:
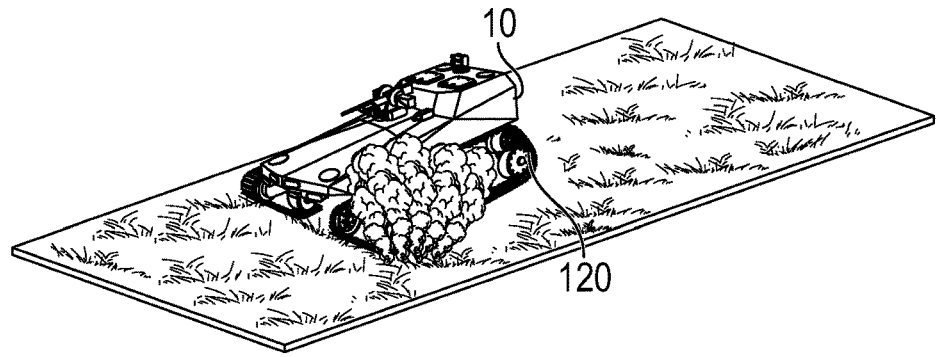
Figure 20D:
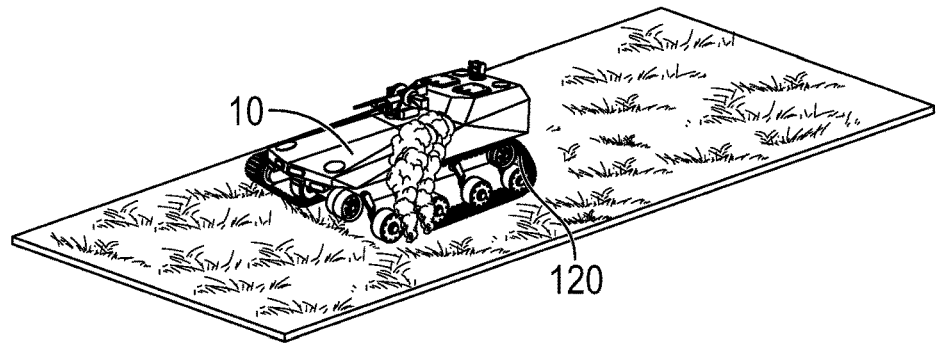
Figure 20E:
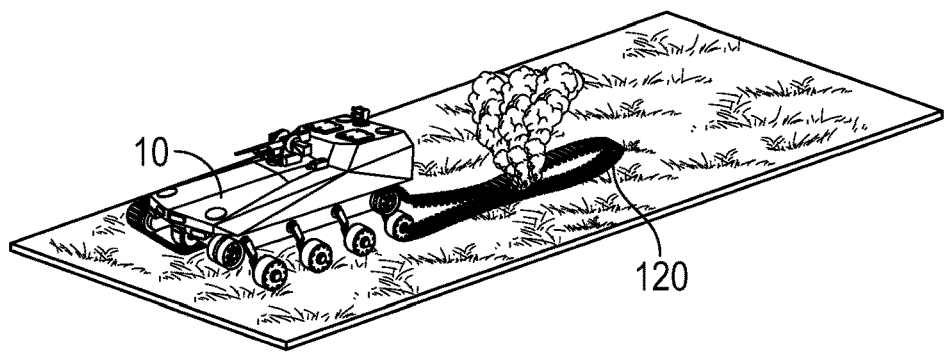

FIGS. 20A-25C illustrate the resilience of the vehicle 10 in various situations. In FIG. 20A, an IED is located in the path of the vehicle 10. In FIG. 20B, the vehicle triggers the IED In FIG. 20C, a front left portion of the track 120 takes damage. In FIG. 20D, a middle portion of the track 120 is destroyed, and in FIG. 20E, the vehicle 10 continues operating using driven road wheels 1110.

Figure 21A:
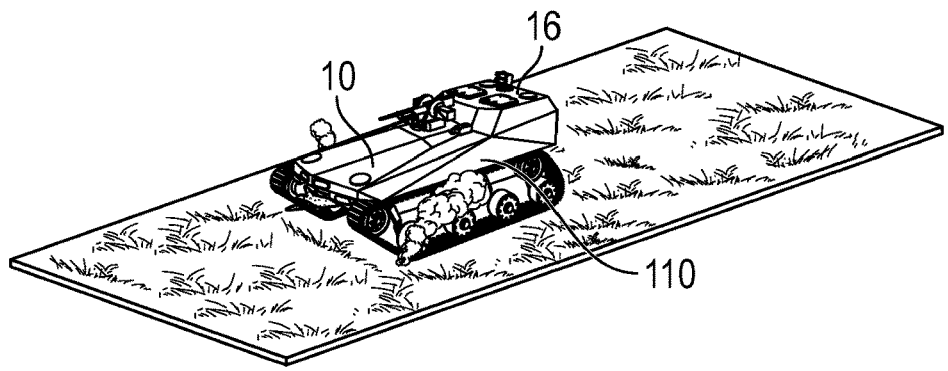
FIGS. 21A-21E illustrate another sequence of events wherein the support vehicle of FIG. 1A makes contact with an improvised explosive device (IED).
Figure 21B:
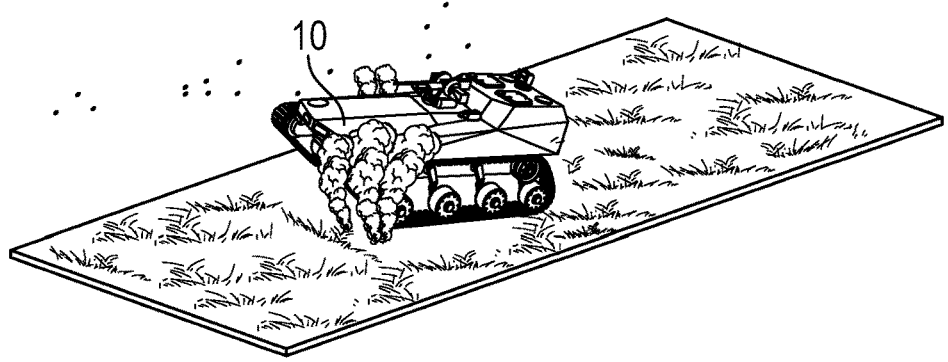
Figure 21C:
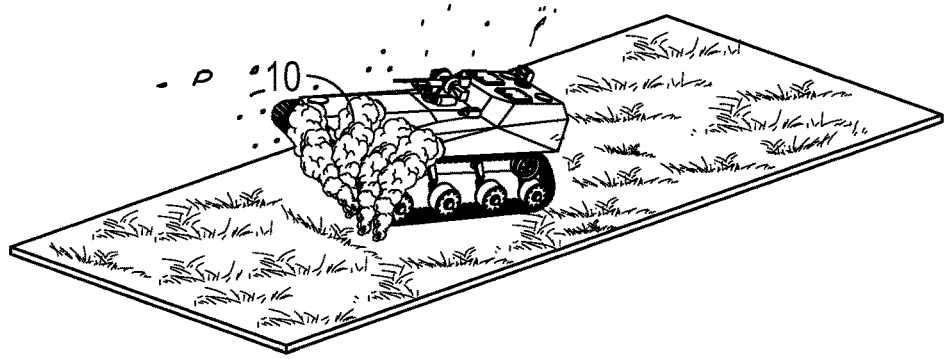
Figure 21D:
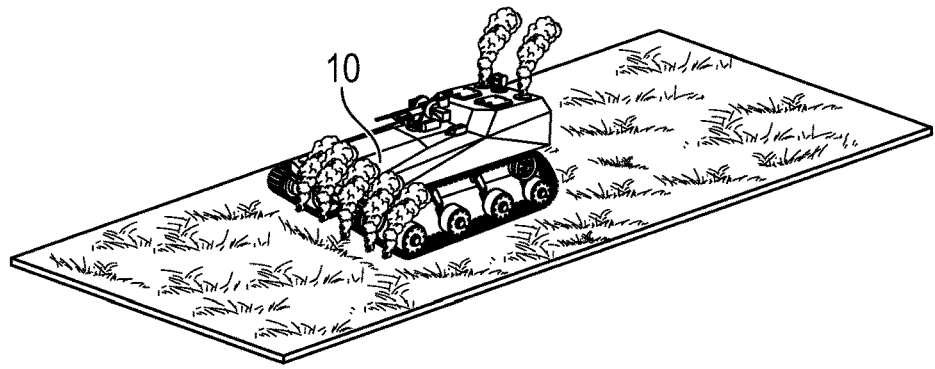
Figure 21E:
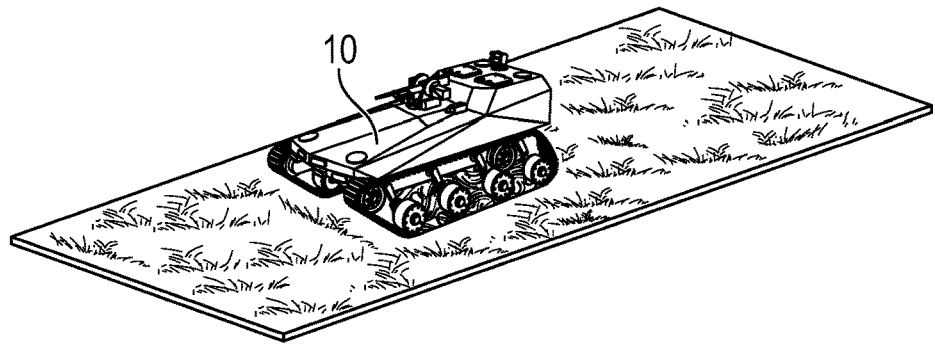

In FIG. 21A, the vehicle 10 makes contact with an IED. In FIG. 21B, the blast event launches the vehicle 10 into the air. The v-hull 110 can act to direct the force of the blast out and away from the vehicle 10. In FIG. 21C, the active blast countermeasure system additionally reacts forcing the vehicle 10 back down to the ground. In FIG. 21D, the active blast countermeasure system counteracts the explosion and in FIG. 21E, the vehicle 10 is rendered inoperable but the crew is safe in the crew module 16.

Figure 22A:
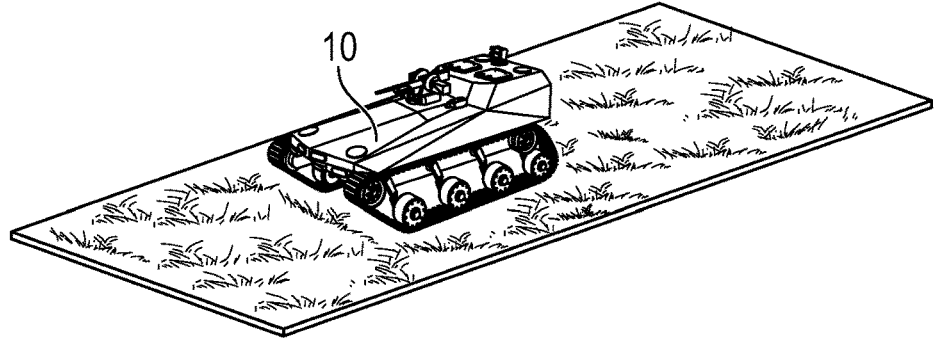
FIGS. 22A-22E illustrate a sequence of events wherein the support vehicle of FIG. 1A makes contact with an anti-tank guided missile and/or a rocket propelled grenade.
Figure 22B:
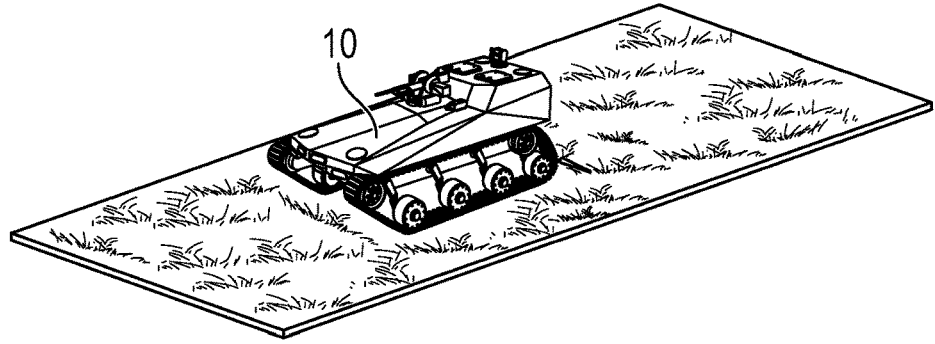
Figure 22C:
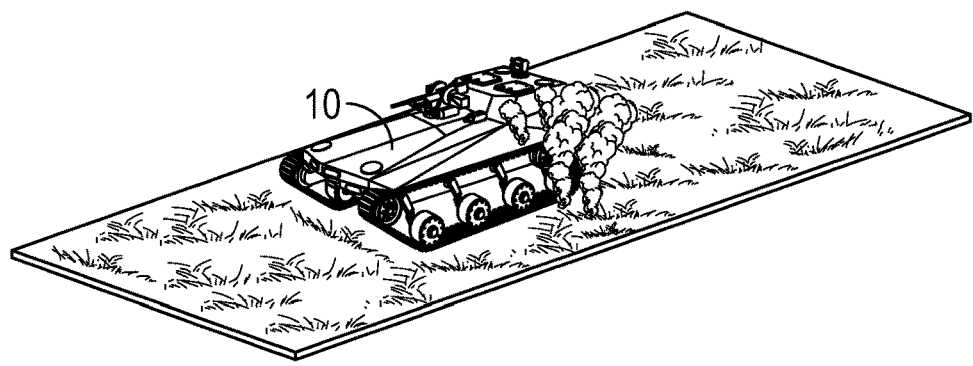
Figure 22D:
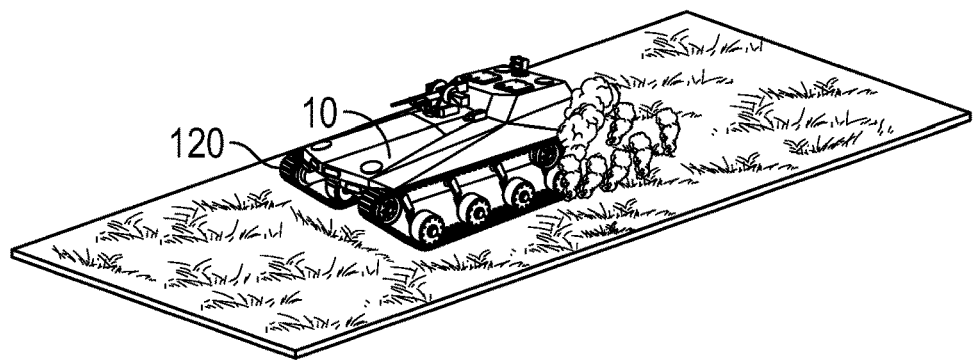
Figure 22E:
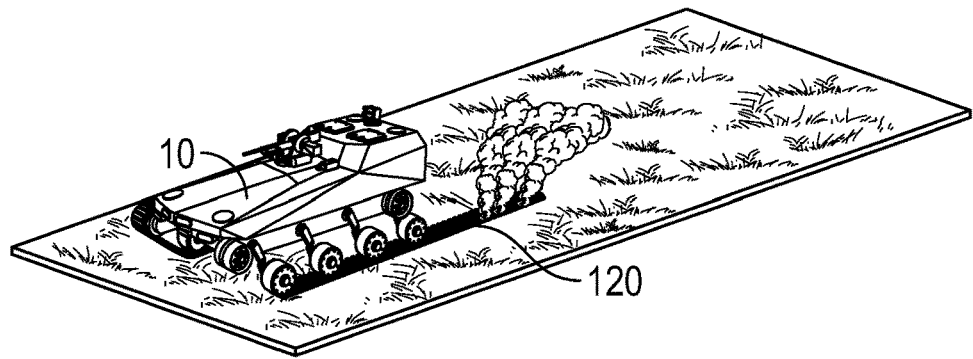

In FIG. 22A, the vehicle 10 is in a hostile environment with enemies having an anti-tank guided missile and/or a rocket propelled grenade. In FIG. 22B, the vehicle 10 is hit from the side by a missile or grenade. In FIG. 22C, the left side of the vehicle 10 takes damage. In FIG. 22D, a driven road wheel 1110 (shown in FIG. 13), a trailing arm 305 (shown in FIG. 3), and a track 120 are destroyed. In FIG. 22E, the vehicle 10 continues moving using the using the remaining driven road wheels 1110, and the suspension is raised on the left side to compensate for suspension damage.

Figure 23A:
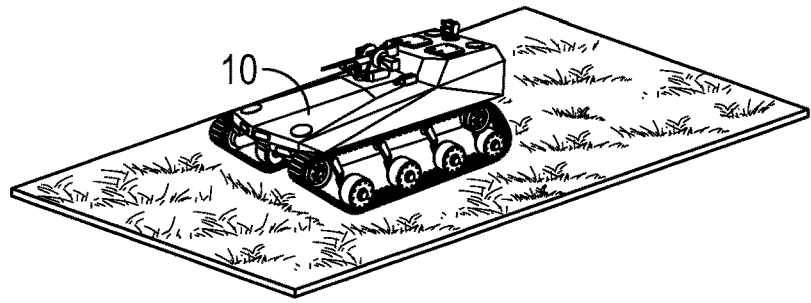
FIG. 23A illustrates an armor-piercing round piercing the armor of FIG. 16A of the support vehicle of FIG. 1A.
Figure 23B:
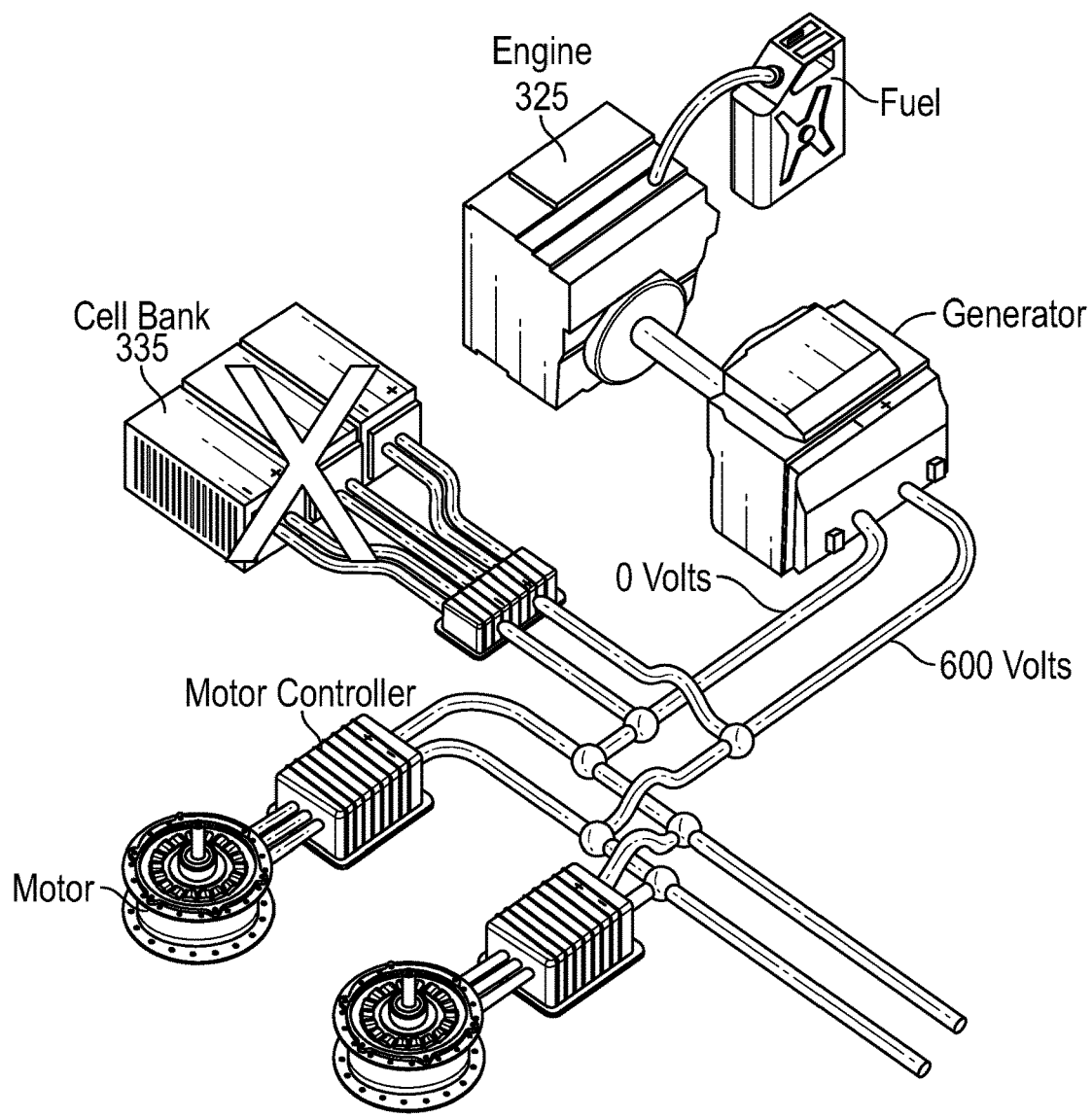
FIG. 23B illustrates the serial hybrid drivetrain of FIG. 10 having destroyed battery packs, as a result of an armor-piercing round.

In FIG. 23A, an armor-piercing round pierces the armor 1605 (shown in FIG. 16) and destroys the battery packs of the vehicle 10. In FIG. 23B, the batteries 335 of the battery pack is damaged and the vehicle 10 will not be able to store electricity in its battery banks. As a result, the vehicle can operate in the engine mode, wherein the engine 325 (shown in FIG. 3) must remain in continuous operation. The vehicle 10 then essentially transitions into a normal fuel-consuming vehicle and can be viable as long as it has fuel.

Figure 24A:
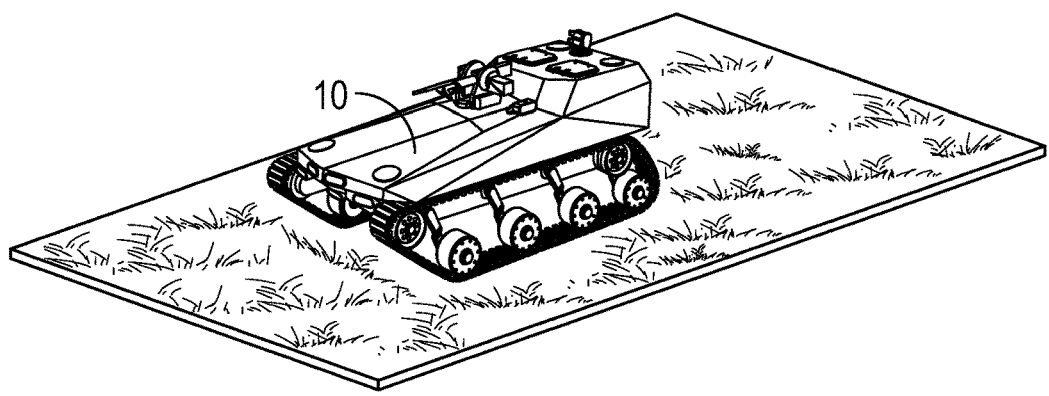
FIG. 24A illustrates an armor-piercing round piercing the armor of FIG. 16A of the support vehicle of FIG. 1A, according to another aspect of the disclosure.
Figure 24B:
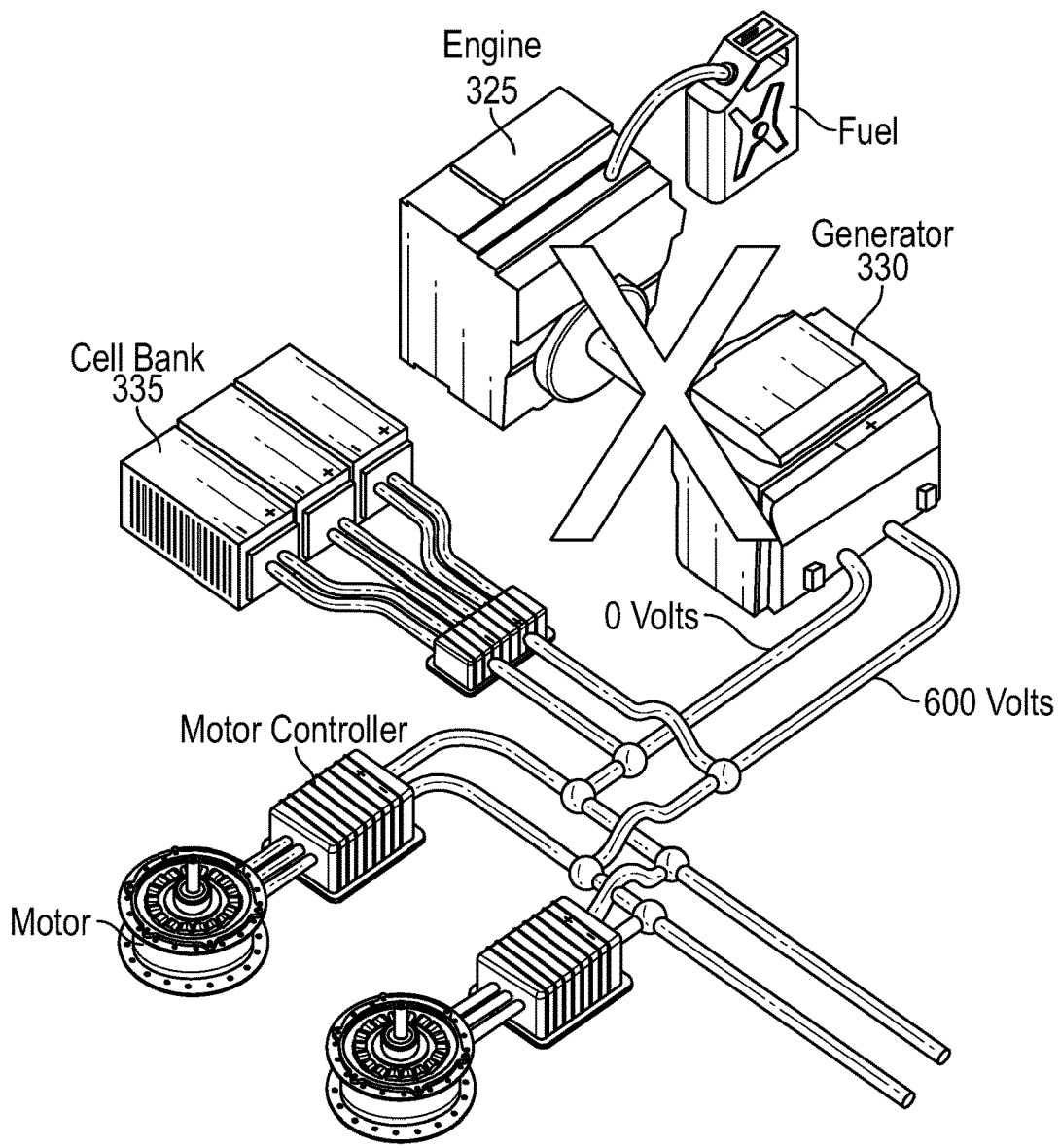
FIG. 24B illustrates the serial hybrid drivetrain of FIG. 10 having a destroyed generator and/or a destroyed engine as a result of an armor-piercing round.

In FIG. 24A, an armor-piercing round pierces the armor 1605 and destroys the engine 325 (shown in FIG. 3) and/or the generator 330 (shown in FIG. 3) of the vehicle 10. In FIG. 24B, without the generator 330 (shown in FIG. 3), the vehicle 10 cannot generate electoral power. With traditional fuel-consuming vehicles, a hit to the engine block would be a mobility kill. The vehicle 10 of the present application, however, can maneuver and drive in the battery mode using the remaining power in its batteries 335. Depending on the remaining stored energy in the battery banks at the time of the hit, the vehicle 10 may be able to return to base. At a minimum, the vehicle 10 can remove itself from the combat engagement area under its remaining battery power. As such, the vehicle 10 can operate in the engine mode without batteries 335, wherein the first power module 1025 can provide power to the motors 1005, or conversely, the vehicle 10 can operate entirely on battery power in a battery mode (for a limited duration), wherein the second power module 1030 can provide power to the motors 1005. The vehicle 10 can also operate in a normal mode, wherein either or both of the first and second power modules 1025,1030 can provide power to the motors 1005.

Figure 25A:
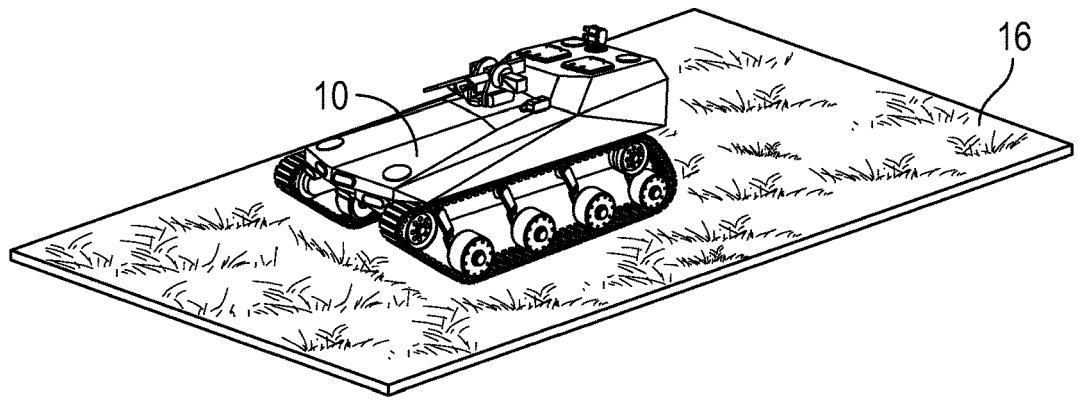
FIG. 25A illustrates an armor-piercing round piercing the armor of FIG. 16A of the support vehicle of FIG. 1A and entering the crew module of FIG. 5.
Figure 25B:
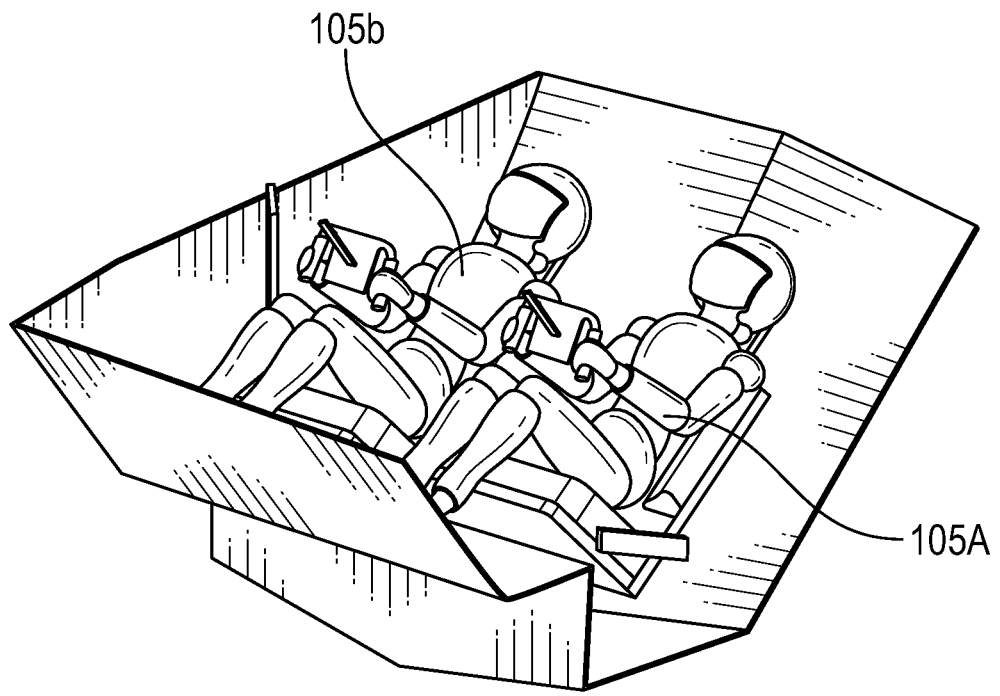
FIG. 25B illustrates the crew module of FIG. 5 wherein a driver within the crew module is injured.
Figure 25C:
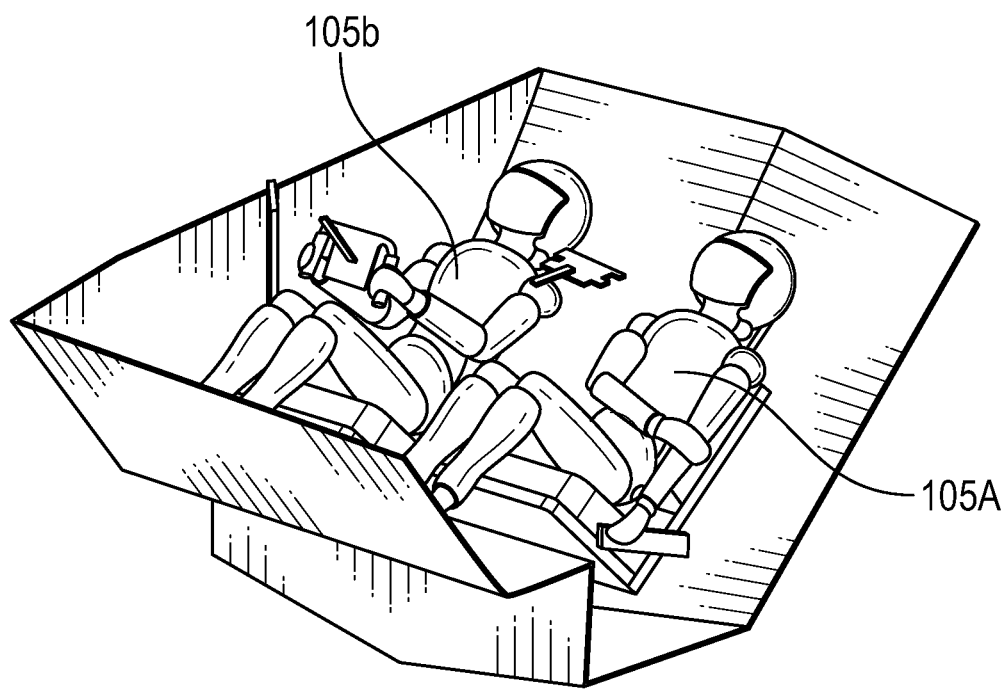
FIG. 25C illustrates the crew module of FIG. 5 wherein a gunner within the crew module can drive the support vehicle of FIG. 1A.

In FIG. 25A, an armor-piercing round pierces the armor 1605 and entered the crew module 16 of the vehicle 10. In FIG. 25B, the round injures the driver 105a of the vehicle 10 and he is rendered unable to operate the vehicle 10. In FIG. 25C, because both crew members 105a,b use a common controller 36 (shown in FIGS. 19A,B), the gunner 105b of the vehicle 10 can take over the requirements of operating the vehicle 10.

One should note that conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

The invention claimed is:

1. A modular military vehicle comprising:
a vehicle hull;
a crew module removably mounted to the vehicle hull;
a plurality of wheels mounted to the vehicle hull, the plurality of wheels comprising at least one driven wheel; and
an electric drive system configured to drive the at least one driven wheel and selectively operable in an engine mode and a battery mode, the electric drive system comprising a first power module removably mounted to the vehicle hull and a second power module removably mounted to the vehicle hull, the first power module comprising an engine and a generator and configured to drive each of the driven wheels in the engine mode, the second power module comprising a battery and configured to drive each of the driven wheels in the battery mode;
wherein the modular military vehicle is drivable with either of the first power module and second power module removed.

2. The modular military vehicle of claim 1, wherein;
each of the driven wheels comprises a hub; and
the electric drive system comprises a motor mounted within each of the hubs.

3. The modular military vehicle of claim 2, wherein the generator is configured to supply power to the battery and the motors.

4. The modular military vehicle of claim 1, wherein the vehicle hull comprises at least one alignment pin configured to facilitate mounting the crew module to the vehicle hull.

5. The modular military vehicle of claim 1, further comprising modular armor configured to be selectively mounted to and unmounted from the crew module, wherein the modular armor comprises at least three inches of armor surrounding the crew module.

6. The modular military vehicle of claim 1, further comprising a weapons module removably mounted to the vehicle hull.

7. The modular military vehicle of claim 1, wherein the plurality of wheels have no mechanical torque transmission connection to the hull.

8. A military vehicle comprising:
a vehicle hull;
a plurality of wheels mounted to the hull, the plurality of wheels comprising at least one driven wheel;
an electric drive system configured to drive the at least one driven wheel, the electric drive system comprising a first power module removably mounted to the vehicle hull and a second power module removably mounted to the vehicle hull, wherein each of the first power module and second power module are configured to independently operate each of the driven wheels, the modular military vehicle drivable with either of the first power module and second power module removed; and
a suspension system configured to selectively elevate at least one of the driven wheels.

9. The military vehicle of claim 8, wherein;
the modular military vehicle further comprises a track;
a ground portion of the track is configured to contact a ground surface; and
the driven wheels engage the ground portion of the track.

10. The military vehicle of claim 9, wherein the track is a rubber composite band track.

11. The military vehicle of claim 8, further comprising a weapons module removably mounted to the vehicle hull.

12. The military vehicle of claim 11, further comprising a vehicle controller removably mounted to the vehicle, the vehicle controller configured to act as a steering wheel when mounted to the vehicle.

13. The military vehicle of claim 8, further comprising a crew module, wherein the crew module comprises at least two seats, each of the at least two seats configured to support a crew member, and wherein each of the at least two seats is in a reclined positioned.

14. The military vehicle of claim 8, wherein the electric drive system is remotely operable.

15. The military vehicle of claim 8, wherein the suspension system comprises a trailing arm defining a first end and a second end, the first end connected to the driven wheel and the second end connected to the hull through a rotating joint.

16. A method for using a modular military vehicle comprising:
- providing the modular military vehicle comprising a vehicle hull, an alignment pin, a first power module, a second power module, and a plurality of wheels mounted to the vehicle hull, the plurality of wheels comprising at least one driven wheel;
- aligning a receiver of one of a weapons module and a crew module with the alignment pin;
- engaging the alignment pin with the receiver to mount the one of a weapons module and a crew module to the hull;
- operating each of the driven wheels with a first power module to drive the modular military vehicle;
- removing the first power module from the modular military vehicle; and
- operating each of the driven wheels with the second power module to drive the modular military vehicle.

17. The method of claim 16, further comprising mounting the other of the weapons module and the crew module to the hull.

18. The method of claim 16, further comprising disengaging the alignment pin from the receiver to unmount the one of the weapons module and crew module from the hull.

* * * * *